US011344754B1

(12) United States Patent

Piatt

(10) Patent No.: US 11,344,754 B1

(45) Date of Patent: *May 31, 2022

(54) RESPIRATORY FACE MASK FOR IMPROVED COMMUNICATIONS

(71) Applicant: ZVerse, Inc., West Columbia, SC (US)

(72) Inventor: Michael J. Piatt, Springboro, OH (US)

(73) Assignee: ZVerse, Inc., West Columbia, SC ( * ) Notice: Subject to any disclaimer, the term of this patent is extended or adjusted under 35 U.S.C. 154(b) by 0 days.

This patent is subject to a terminal disclaimer.

(21) Appl. No.: 17/534,064

(22) Filed: Nov. 23, 2021

Related U.S. Application Data

(63) Continuation-in-part of application No. 17/478,367, filed on Sep. 17, 2021, now Pat. No. 11,305,136.

(60) Provisional application No. 63/118,720, filed on Nov. 26, 2020.

(51) Int. Cl.

| | |
|---|---|
| ***B01D 46/44*** | (2006.01) |
| ***A62B 23/02*** | (2006.01) |
| ***A41D 13/11*** | (2006.01) |

(52) U.S. Cl.

CPC .......... *A62B 23/02* (2013.01); *A41D 13/1138* (2013.01)

(58) Field of Classification Search

CPC ............ B01D 46/0028; B01D 46/0041; B01D 46/44; B01D 46/4245; B01D 2279/65; A41D 13/1107; A62B 18/006; A62B 18/084; A62B 23/02

USPC .......... 55/385.1, DIG. 33, DIG. 34, DIG. 35; 96/416; 128/202.22, 205.29

See application file for complete search history.

(56) References Cited

U.S. PATENT DOCUMENTS

| | | | | |
|---|---|---|---|---|
| 2020/0406069 | A1* | 12/2020 | Fu | A62B 18/084 |
| 2021/0290988 | A1* | 9/2021 | Salvino | A62B 18/025 |

* cited by examiner

*Primary Examiner* — Minh Chau T Pham

(74) *Attorney, Agent, or Firm* — Tracy Jong Law Firm; Cheng Ning Jong; Louis Reale

(57) ABSTRACT

The present disclosure delineates both active as well as passive respiratory filtration systems. The respiratory filtration systems are configured to be worn by a user, providing the user protection from the ambient environment, possibly containing microorganisms, pathogens, particulate matter, and the like. Some embodiments are also designed to protect observers, by filtering user exhalation air released into the environment. Nontransparent members of the system are configured to be located over impassive features of the user's face, such as the cheeks or chin areas. The disclosed respiratory filtration system(s) includes one or more hygienic materials. The hygienic materials are carefully selected and disposed at predetermined locations within the respiratory filtration system, so to optimize user to the observer(s) communications. Optimized communications include the transmission of distortion-free speech and/or unobstructed view of the user's oronasal area—via an expression window(s).

9 Claims, 20 Drawing Sheets

FIG. 4
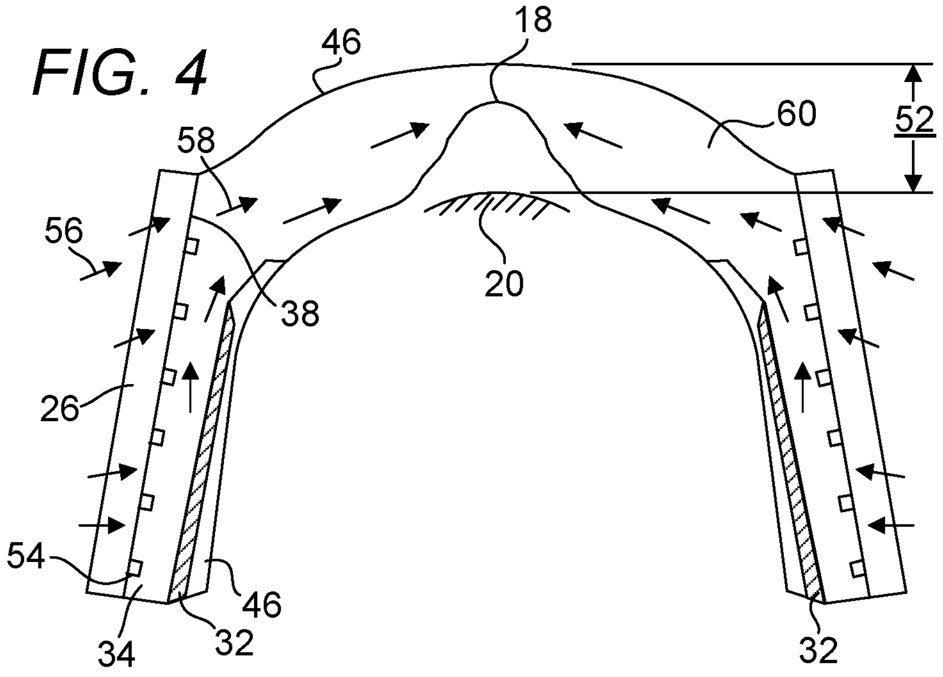
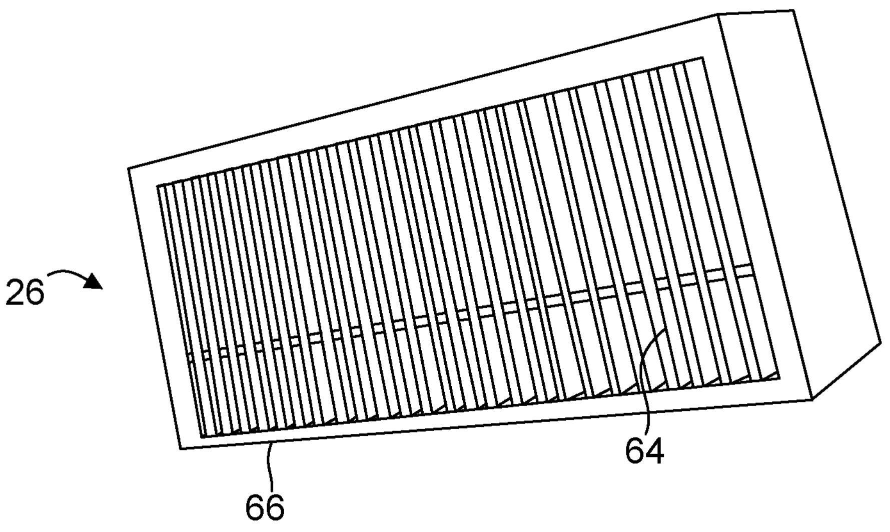
FIG. 5

RESPIRATORY FACE MASK FOR IMPROVED COMMUNICATIONS

PRIORITY CLAIM AND RELATED APPLICATIONS

This application claims the benefit of priority from non-provisional application U.S. Ser. No. 17/478,367 filed on Sep. 17, 2021 and provisional application U.S. Ser. No. 63/118,720 filed on Nov. 26, 2020. Each of said applications is incorporated by reference in its entirety.

FIELD OF THE INVENTION

The present invention relates to active as well as passive respiratory protective face mask systems. More specifically, the present invention is directed to face mask systems configured such that the filtration media is disposed over one or more user impassive facial features, in a manner so to not obstruct expressive facial features. The expressive facial features of primary concern are the user's oronasal areas, especially the mouth area. In preferred embodiments at least the mouth area is visible via a transparent oronasal cover, or the like. Other embodiments are directed to protective face mask systems having nontransparent oronasal covers, where distinct, understandable speech communications are emphasized over visual type of communications, such as face masks used in dark room environments, and the like.

BACKGROUND OF THE INVENTION

Face masks are universally used in the medical profession and elsewhere to reduce the risk of transferring microorganisms, such as infectious bacteria, viruses, between individuals, such as health care provider and a patient, a teacher and their students; or in any context where nose, mouth and eye protection may be suggested or required. Face masks having a transparent portion over the nose and mouth areas so such oronasal features are visible to an observer, will improve communications and rapport between the wearer and patient, reduce patient anxiety and improve face mask wearing compliance of caregivers, and the like, that should be wearing face masks. Nonetheless, there exists a need for face mask systems that provide more effective barrier to air-borne contaminants, such as bacteria and viruses while still providing for improved communication between the face mask user and the observer(s), e.g., health care personnel and the patient.

Furthermore, in covering the mouth a certain amount of acoustic or speech type of communication is lost. Even though the mask is permeable to air, the covering does degrade some of the clarity with respect to the wearer's speech, making it more difficult to understand the face mask user. The situation is exacerbated if the user wearing the face mask is soft spoken, does not speak distinctly, and the like. Opaque type mask face masks carry the additional disadvantage in which the oronasal portions of the speaker, especially the mouth cannot be seen, thereby removing the vital visual portion of face-to-face communications, e.g., the hiding of a reassuring smile, lip movements, emotional expressions, and the like.

Over the years, respiratory face mask technology has evolved, and standards have been established to quantify their performance and assure product quality and consistency. For example, presently, it's common to locate passive respiratory face masks designed to meet or exceed the OSHA N95 standard; wherein such face masks are commonly used by medical professionals, industrial workers, and the like. These passive masks, when properly fitted and worn, are designed to filter both the user's inhalation air as well as exhalation air. This common-place type of face mask design is typically fabricated from opaque filtration material (s), which obscure the user's oronasal area.

Typically, N95 capable face masks are constructed from nonwoven filtration media designed to filter at least 95% of the airborne particulates entering and exiting the N95 filtration media, given a particle size of at least 0.3 microns. For such facemasks to be effective, it is essential that a strong seal be made with the user's face, such as the perimeter about the user's nose and mouth. Over time, this intense facial seal and the associated tight-fitting, thin attachment straps, lead to considerable user discomfort. The root and/or subsequent causes of discomfort include: heat related issues, skin irritations, labored breathing, tight fitting straps, onset of claustrophobic feelings, and the like. Eventually, the wearer of such passive face masks will predictably experience fatigue, since they must forcefully inhale against the ever rising pressure drop of the air being forced through the filter media; likewise, when exhaling, exhalation air must forced out through the same filter media, but in the opposite direction. A substantial portion of the population have complained that face masks fabricated from N95 certified filtration media are difficult to breathe through, having a pressure drop of over 0.5 inches of water across a typical filtration media. Due to the restricted air flow, the breathing air in the mask's internal volume will quickly overheat and harbor excess moisture leading to additional user discomfort. In certain circumstances the aforementioned points of user discomfort are significant factors that determine whether a potential mask wearer will don suitable protective gear or not. Moreover, due to the facial feature variations across the general population, an adequate seal between the face mask and the user may not always be possible with all users, especially in situations where the user possesses facial hair.

Another type of passive face mask system that overcomes many of aforementioned drawbacks associated with N95 type face masks, is the simple transparent face shield. These shields will typically cover or hover over the user's nose, mouth, and eyes. The protective lens and support apparatus can be substantially free from contact with the user's face. Unfortunately, because these face shields possess open, unprotected perimeters, pathogens and/or particulate matter have several unobstructed pathways to reach the user's oronasal areas. These shields typically find utility in environments where the user is seeking protection from substantially large occupational airborne particulates or like contaminates. For example, shrapnel from industrial processes, e.g., grinding wheel debris; splatter and splash type contaminants from medical procedures; and so forth.

It's apparent, that in the protective face mask arts, there's a long felt need for improved active as well as passive respiratory filtration systems that provide the user protection from the ambient environment, possibly containing microorganisms, pathogens, particulate matter, and the like. Also, of value, are systems designed that will simultaneously protect others by filtering the exhalation air released into the environment by the user. Also of importance are respiratory filtration systems that optimize user-observer(s) communications. Optimized communications include the transmission of clear speech and/or unobstructed view of the user's oronasal area, especially the mouth, depending on the communicative circumstances between the user and the observer (s), or the like.

SUMMARY OF THE INVENTION

The present disclosure delineates both active as well as passive respiratory filtration systems in the form of a face mask. The respiratory filtration systems are configured to be worn by a user, providing the user protection from the ambient environment, possibly containing microorganisms, pathogens, particulate matter, and the like. The respiratory filtration system is also designed to protect others by filtering the exhalation air released into the environment by the user. The disclosed respiratory filtration system(s) are comprised from one or more hygienic materials. The hygienic materials are carefully selected and disposed at predetermined locations within the respiratory filtration system, so to optimize user-observer(s) communications. Optimized communications include the transmission of distortion-free speech and/or unobstructed view of the user's oronasal area, especially the mouth.

Accordingly, it is an object of the present invention to optimized user communications to one or more observers, or the like. Communications include user's speech as well as facial gestures, lip movements, and the like, enabled by use of a transparent oronasal cover or expression window, which allows a substantially unobstructed view of the user's oronasal area, especially the mouth by an onlooker or observer.

It is another object of certain embodiments of present invention to provide a respiratory filtration system, optimized for an unobstructed view of the user's oronasal area, where the air filters are located over one or more impassive facial features. For example, contained within right and left chamber assemblies, the filter containing assemblies are positioned under the user's respective right and left eyes, in the general area of the user's right and left cheeks.

It is yet another object of certain embodiments of present invention having an oronasal cover where at least a portion of the oronasal cover is configured from a substantially transparent material, creating an expression window, viewing portal, or the like, to enable an observer a clear view of the user's oronasal features.

It is a further object of certain embodiments of the present invention to provide an oronasal cover having a transparent front face, comprising at least one planar surface. In preferred embodiments, given an upright, vertical face mask orientation, one or more of the transparent planar surfaces, or expression windows is configured to possess an angle of inclination from about 150 to about 170 degrees, so to minimize/eliminate reflective glare experienced by an observer(s).

It is another object of certain embodiments of the present invention to provide an oronasal cover configured from a hygienic material that is optimized for distortion-free transmission of speech from the face mask user to one or more observers. Qualifying nontransparent oronasal covers are acceptable in specific situations, e.g., when a user(s) is speaking into a microphone, working in a darkroom environment, or the like. In such scenarios, a view of the user's oronasal area by an observer is not available in the first place.

It is yet another object of certain embodiments of the present invention to provide at least one removable, modular forced air module, which provides a user additional or supplemental filtered air produced by battery operated fan(s) functionally coupled to an air filter. Preferred embodiments further comprise a control system for managing battery power, controlling the volume of supplemental filtered air delivered per unit time, and the like.

It is yet another object of certain embodiments of present invention to provide an oronasal cover where at least the portion of the cover, which resides over the user's mouth, is positioned at least about 1 inch away from the user's mouth, so that reflective speech distortions are minimized.

It is a further object of certain embodiments of the present invention to provide a conforming seal disposed about the oronasal circumferential edge, located on the outer edge portion of the oronasal cover, to strengthen the sealing engagement between the face mask and the user.

It is yet another object of certain embodiments of present invention to provide input filters and/or output filters fabricated from a variety of filtration materials, including: pathogenic filtering materials, particulate contaminant filtering materials, High Efficiency Particulate Air (HEPA) certified materials, N95 capable materials, and any combination thereof. Composite filters comprising two or more layers of various filtering materials can be configured to yield enhanced air filtration results.

It is another object of this invention to provide a relatively simple system that is economical from the viewpoint of the manufacturer and consumer, is susceptible to low manufacturing costs regarding labor and materials, and which accordingly evokes low prices for the consuming public, thereby making it economically available to the buying public.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

In this respect, before explaining at least one embodiment of the invention in detail, it is to be understood that the invention is not limited in its application to the details of construction and the arrangements of the components set forth in the following description or illustrated in the drawings. The present invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the conception regarded as the present invention.

Particular Advantages of the Invention

The present disclosure delineates both active as well as passive respiratory filtration systems. The respiratory filtration systems are configured to be worn by a user, providing the user protection from the ambient environment, possibly containing microorganisms, pathogens, particulate matter, and the like. The respiratory filtration system is also designed to protect others by filtering the exhalation air released into the environment by the user. The disclosed respiratory filtration system(s) are comprised from one or more hygienic materials. The hygienic materials are carefully selected and disposed at predetermined locations within the respiratory filtration system, so to optimize user to the observer(s) communications. Optimized communications include the transmission of clear speech and/or unobstructed view of the user's oronasal area, especially the mouth.

BRIEF DESCRIPTION OF THE DRAWINGS

The ensuing detailed description section makes reference to the annexed drawings. An enhanced understanding of the present invention will become evident when consideration is given to the detailed description thereof and objects other than the aforementioned become apparent. The invention will be described by reference to the specification and the annexed drawings, in which like numerals refer to like elements, and wherein:

FIG. 4 illustrates a top view of an exemplary passive respiratory filtration system showing typical airflow paths for the inhalation portion of a user's breathing cycle.

FIG. 5 illustrates a perspective view of an exemplary filter for use in the right and left chamber assemblies.

DEFINITIONS OF TERMS USED IN THIS SPECIFICATION

Figure 1:
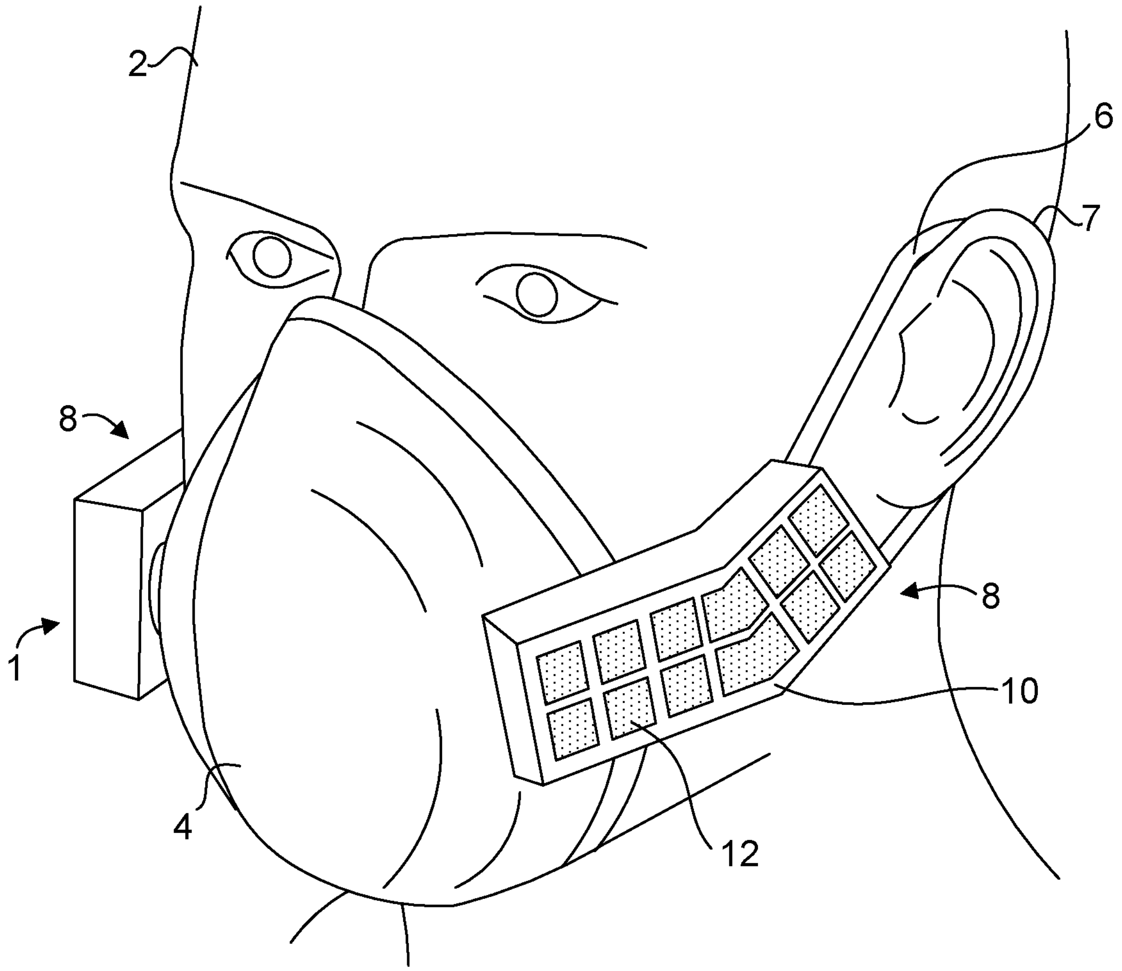
FIG. 1 illustrates a perspective view of a compact embodiment of a passive respiratory filtration system affixed to a user.

The active respiratory open face shield filtration system (AROFSS) discussed throughout this disclosure shall have equivalent nomenclature, including, but not limited to: the device, the system, the assembly, the face shield, the unit, the present invention, or the invention. Additionally, the term exemplary shall possess a single meaning throughout this disclosure; wherein the sole focus is directed to serving as an example, instance, or illustration. The terms: observers, others or bystanders shall be defined as individuals within the immediate environment of the user, having a reasonable probability of receiving an airborne microorganism or pathogen from the user. The term upper torso shall be understood to include the shoulders, neck, and any member of the head capable of providing support for the respiratory face shield systems.

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Note that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by", "possessing" and "having" are all to be interpreted as open-ended terms, are all considered equivalent terms, and are used interchangeably.

The term hygienic material shall broadly define a material that has the capacity to block or substantially filter microorganisms or particulates. The hygienic material can be optically transparent, opaque, or any remaining nontransparent possibilities.

In this disclosure, the term oronasal shall broadly defined as pertaining to at least the mouth area of the user, unless otherwise stipulated.

PARTS/FEATURES LIST

1—passive respiratory filtration system (compact embodiment)
2—user (head portion shown)
4—oronasal cover
6—support strap(s), part of harness support system
7—ear(s)
8—right and left chamber assemblies
10—vented outer wall
12—apertures, allows air to pass in both directions
14—cheek areas (both right and left cheek areas of user)
16—nose-mouth perimeter
18—nose
20—mouth
21—passive respiratory filtration system (modular embodiment)
22—right chamber assembly
24—left chamber assembly
26—air filter
28—end-cover
30—vented outer wall
32—inner wall
34—elongated air filter dispersion cavity (EAFDC)
36—air portal
38—inner face (of filter 26)
40—outer face (of filter 26)
42—conforming seal
44—oronasal circumferential edge
46—oronasal cover
48—front face (of oronasal cover 46)
50—fastener (threaded ring which attaches to end of air portal 36)
52—mouth to oronasal cover gap
54—stop(s), for accurate filter 26 placement
56—unfiltered air (from ambient environment surrounding user)
57—stops (to position/hold the air filters so to create an EAFDC 34)
58—filtered air
60—breathing chamber
64—pleats
66—seal (gasket for sealing perimeter of filter 26)
68—active respiratory filtration system (modular embodiment)
70—oronasal cover
72—front face (of oronasal cover 70)
74—right chamber assembly (modular embodiment)
76—left chamber assembly (modular embodiment)
78—right forced air module
80—left forced air module
82—active respiratory filtration system, affixed to a user
84—conformable engagement seal
86—expression window (observer's perspective)
87—inhalation phase
88—unfiltered air (portion drawn in from module input 94)
90—supplemental filtered air
92—module output
94—module input
96—air filters (right and left filters)
98—air pumps (fans)
99—complete breathing cycle (inhalation, exhalation)
100—exhalation air (from user)
101—exhalation phase
102—filtered air
103—active respiratory filtration system (modular embodiment)
104—outer module fan housing
105—right chamber assembly
106—fan (s)
107—left chamber assembly
108—inner module fan housing
110—control system
112—control board
114—on-off switch
116—forced air module
118—anti-glare respiratory filtration system (active or passive)
120—power source
122—receiving portion, of right chamber assembly
124—end-cover (for converting an active system to a passive system)
126—oronasal cover
128—upper window (front face of oronasal cover)
130—lower expression window (front face of oronasal cover)
132—angle of inclination
134—supplementary angle (to angle of inclination 132)
136—horizon line (level or parallel to the horizon)
138—rotatable strap plate
140—main portion, of active respiratory filtration system
142—support member, harness plate base
144—pivot point
146—support strap receptacles
148—chin area (impassive facial feature)
150—passive respiratory filtration system (vertical embodiment)
152—upper portion (of housing 156)
154—lower portion (of housing 156)
156—housing
158—seal (oronasal seal)
160—lower air vents
162—upper expression window
163—breathing chamber
164—internal filter cartridge
166—cartridge seal (covers at least the perimeter of outward facing surface of cartridge)
168—filter or filtration media
170—filtration area
172—cartridge housing
174—cartridge retaining clips
176—upper support posts (for securing support straps)
178—external filter cartridge
180—oronasal features (comprising at least the nose and mouth areas)

182—engagement threads (male and female thread features for securing external filter cartridge on to housing 156)
183—advanced seal
184—inboard flexible sealing member
186—housing wall
188—housing edge
190—seal-housing engagement
192—upper seal attachment clips
194—lower seal attachment clips
196—lower support posts (for securing support straps)
197—chamber outer surface (breathing chamber surface exposed to the environment)
198—support strap
199—chamber inner surface (breathing chamber surface facing the user)

DETAILED DESCRIPTION

With reference to the drawings of the present invention, several embodiments pertaining to the faucet system of the present invention thereof will be described. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose. Terminology of similar import other than the words specifically mentioned above likewise is to be considered as being used for purposes of convenience rather than in any limiting sense.

FIG. 1 illustrates a perspective view of a compact embodiment of a passive respiratory filtration system 1 type face mask. Passive respiratory filtration system 1 attaches to user 2 via support straps 6, which engage ears 7. The inner volume associated with oronasal cover 4 comprises breathing chamber 60 (best depicted in FIG. 4). Breathing chamber 60 is fluidly connected to right and left chamber assemblies 8. Each of these chamber assemblies provides a holding enclosure or predetermined location for a filter, such as filter 26. Each chamber assembly possesses a vented outer wall 10 having a plurality of apertures 12, which allows air to pass in both directions, accommodating user's 2 complete breathing cycle, thereby providing user 2 protection from the ambient environment, possibly containing microorganisms, pathogens, particulate matter, and the like. The system also protects others, in the vicinity of user 2, by filtering user 2 exhalation air released into the environment.

The passive respiratory filtration system 1 embodiment is optimized for the transmission of speech from user 2. Oronasal cover 4 configured from a hygienic material that is optimized for the unambiguous, distortion-free transmission of speech from the user to the user's proximate environment. Qualifying oronasal covers that are nontransparent are acceptable in specific situations, e.g., when a user(s) is speaking into a microphone, communicating in dim light situations, communicating with the visually impaired, or the like. In such scenarios, the observer is not present or visually capable of appreciating a clear view of the user's oronasal area. In this embodiment, apertures 12 located on both right and left chamber assemblies 8, provide an additional means for transmitting user's 2 speech from breathing chamber 60 to the user's proximate environment.

Figure 2:
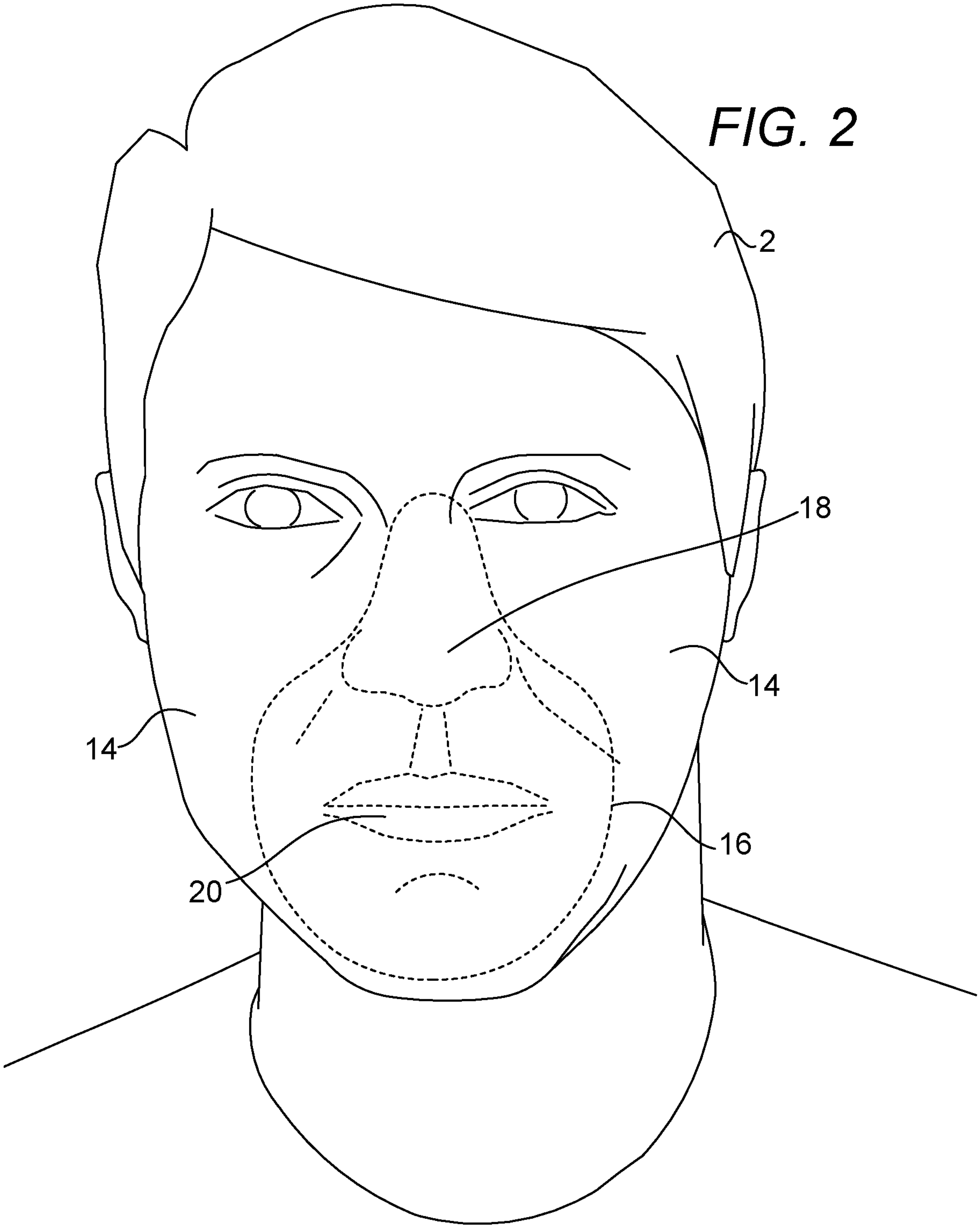
FIG. 2 illustrates a front view of a user, showing pertinent facial features. Delineated is a nose-mouth perimeter produced by the individual geometries of the user's nose and mouth and positional relationships thereof.

FIG. 2 illustrates a front view of user's 2 head, showing pertinent facial features. Delineated is a nose-mouth perimeter 16 formed by the combination of the individual geometries of nose 18 and mouth 20 and positional relationships thereof. The areas delineated as cheek areas 14 are examples of impassive facial features, and are areas for locating nontransparent components, such as filters, so to free up the oronasal area for the use of transparent type oronasal covers 4, typically fabricated from transparent, nonporous, polymeric type materials, which cannot function as filtration media.

Figure 3:
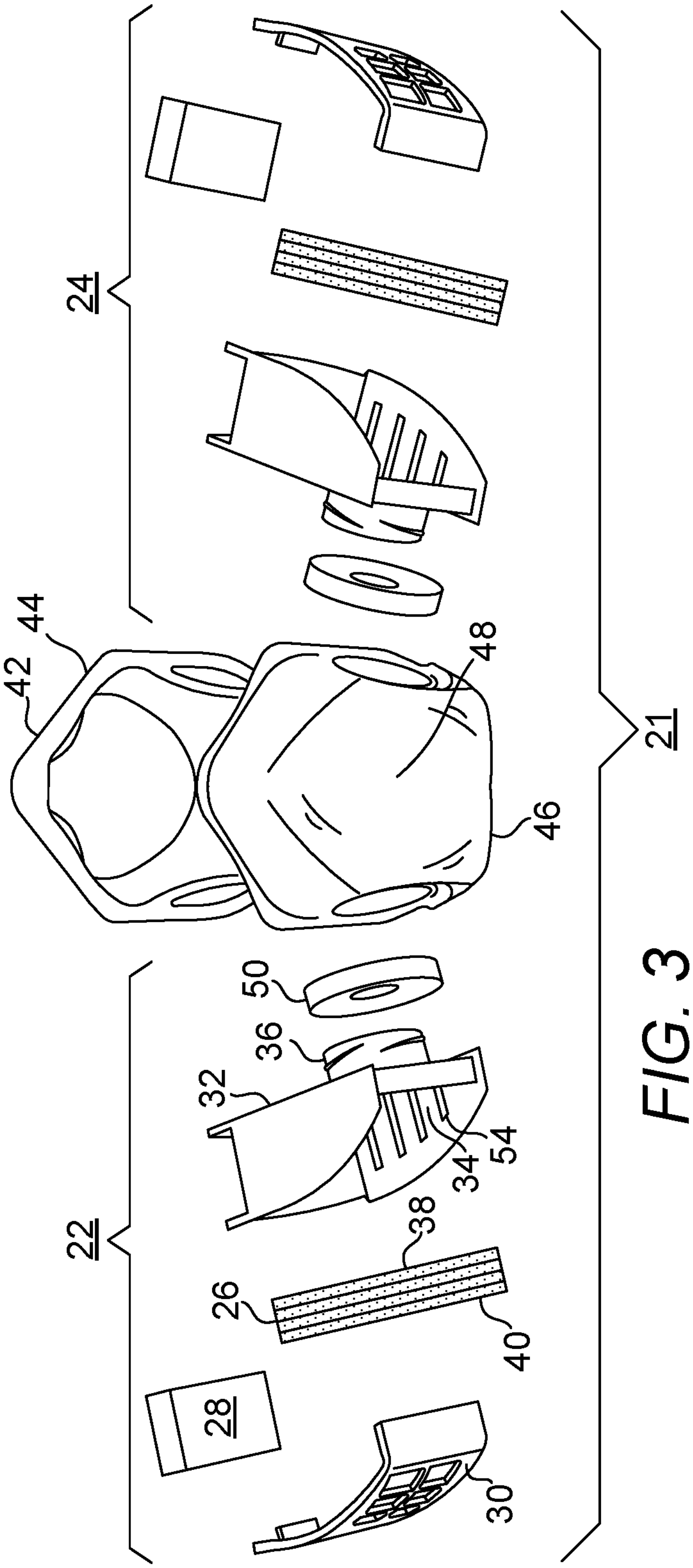
FIG. 3 depicts an exploded perspective view of the typical components comprising a passive, modular respiratory filtration system.

FIG. 3 depicts an exploded perspective view of a modular type filter system embodiment 21, and the typical components comprising such a passive respiratory filtration system of the present invention. Passive respiratory filtration system 21 is comprised of three fluidly interconnected subsystems, right chamber assembly 22, left chamber assembly 24; and centrally located oronasal cover 46, fluidly connecting the three assemblies. It is understood that typical embodiments of the present invention are substantially symmetrical about oronasal cover 46; therefore, components depicted on right chamber assembly 22 are substantially mirror images of those components associated with left chamber assembly 24. Accordingly, right chamber assembly 22 is comprised of the following main components:

Air filter 26, which can be fabricated from a variety of filtration type materials, such as a pathogenic filtering material, a particulate contaminant filtering material, a HEPA certified material or any combination thereof. Air filter 26 is comprised of two main, opposing surfaces, inner face 38 and outer face 40.

Figure 10:
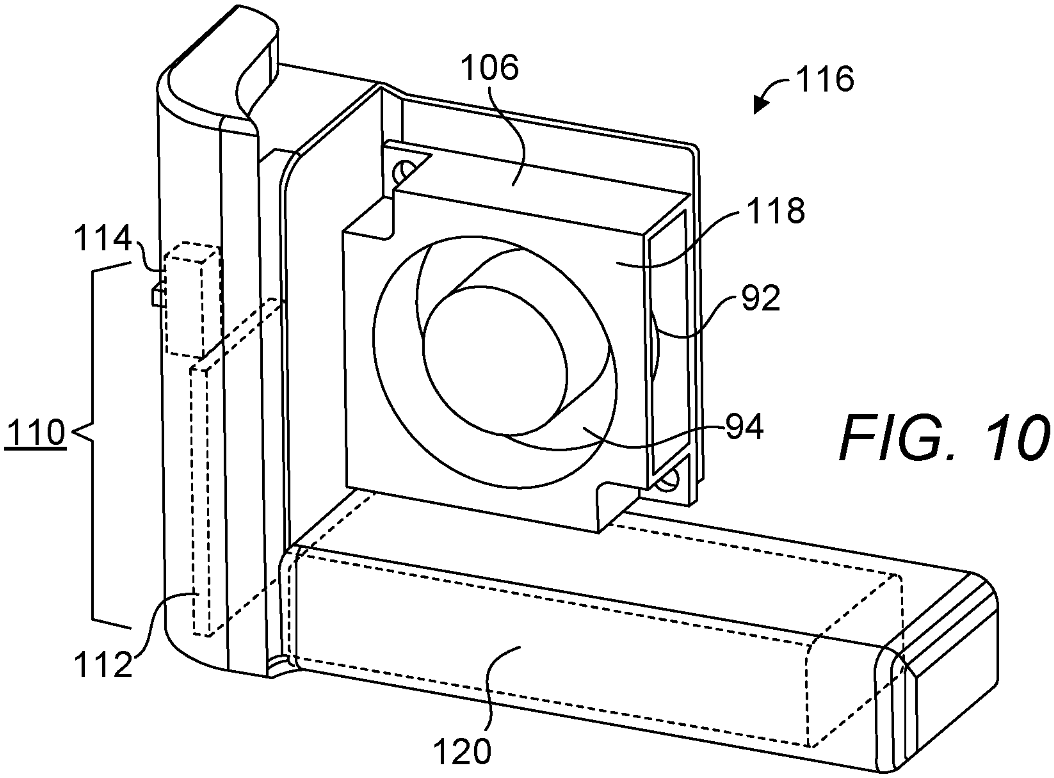
FIG. 10 illustrates a perspective view of a forced air module. Typically, an active, modular respiratory filtration system will have a forced air module configured to be received by the left side of the system and a forced air module configured to be received by the right side of the active face mask filtration system.

End-cover 28, which functions as a service door in some embodiments, in other embodiments it serves to convert an active respiratory filtration system to a passive respiratory filtration system by sealing the openings of chamber assemblies 22, 24, sans a forced air module 116 (best depicted in FIG. 10).

Vented outer wall 30, functions as a support member for chamber assemblies 22, 24; as well as providing a venting means for air movement to and from the system. Inner wall 32 provides a support surface for air portal 36, as well as providing a wall type structure to the elongated air filter dispersion cavity (EAFDC) 34 enclosure. Note that fastener 50 engages distal end portion air portal 36, and functions to fasten oronasal cover 46 to right chamber assembly 22.

Elongated air filter dispersion cavity, EAFDC 34 is a gap or void primarily bound by inner wall 32 and inner face 38 of air filter 26, and serves to load level or balance the air interactions with filter 26, so that one portion of filter 26 does not bear a greater burden than any other portion, thereby extending filter life and improving filter performance. Filter 26 is held in place by a series of stops 54, such stops 54 can take on a variety of forms, including ribs, posts, and the like.

Oronasal cover 46 provides a substantially sealed breathing chamber 60 for user 2. Oronasal cover 46 can be configured from a variety of materials, depending on needs of a given situation. For example, a transparent material can be utilized on at least front face 48 when a clear view of the oronasal portion of the user is of importance; or a nontransparent filtration material, optimized for speech transmission, can be used when verbal communications govern the situation at hand. Oronasal cover 46 includes an oronasal circumferential edge 44 that approximately sealingly engages nose-mouth perimeter 16. Enhanced sealing engagement can be attained by the use of conforming seal 42 disposed about oronasal circumferential edge 44.

FIG. 4 illustrates a top view of an exemplary passive respiratory filtration system 21 showing typical airflow paths for the inhalation phase of user's 2 breathing cycle. Depicted is filter 26 engaging stops 54, which locks filter 26 in a predetermined location. Inner face 38 of filter 26 forms one surface of elongated air filter dispersion cavity EAFDC 34 enclosure, whereas inner wall 32 forms the opposing surface. Breathing chamber 60 formed by oronasal cover 46, which encloses both nose 18 and mouth 20 of user 2. The distance from mouth 20 and the inner surface of oronasal cover 46 is represented as mouth to oronasal cover gap 52. Via experimentation, it has been determined that oronasal cover gap 52 distance is a major factor in the causation of speech distortion. A working range for oronasal cover gap 52, to reduce/eliminate speech distortion is from about 0.5 inches to about 2.0 inches; whereas a more preferred range is from about 1.0 inches to about 2.5 inches; yet another preferred range is from about 1.5 inches to about 3.0 inches.

As user 2 inhales, unfiltered air 56 from ambient environment surrounding user is drawn through air filter 26 and enters EAFDC 34 in a substantially uniform manner about the entire length of each EAFDC 34 area, which prevents the air currents from preferring one portion of air filter 26 over another, thereby promoting filtration load leveling, resulting in the maximization of filter performance as well as filter life.

FIG. 5 illustrates a perspective view of an exemplary air filter 26 for use in the right and left chamber assemblies 22, 24. There are a multitude of air filter types that can be incorporated in the present invention; filter 26 selection is dependent on the specifics of the application(s). Exemplary air filters 26 include: pathogenic filters, particulate contaminant filters, high-efficiency particulate absorbing filters or HEPA certified filters, and the like. Depicted is a HEPA-like filter, characterized by several layers of deeply formed pleats 64. The addition of seal 66 about the perimeter of filter 26 ensures that there is no air leakage between EAFDC 34 and user's 2 immediate external environment.

Figure 6:
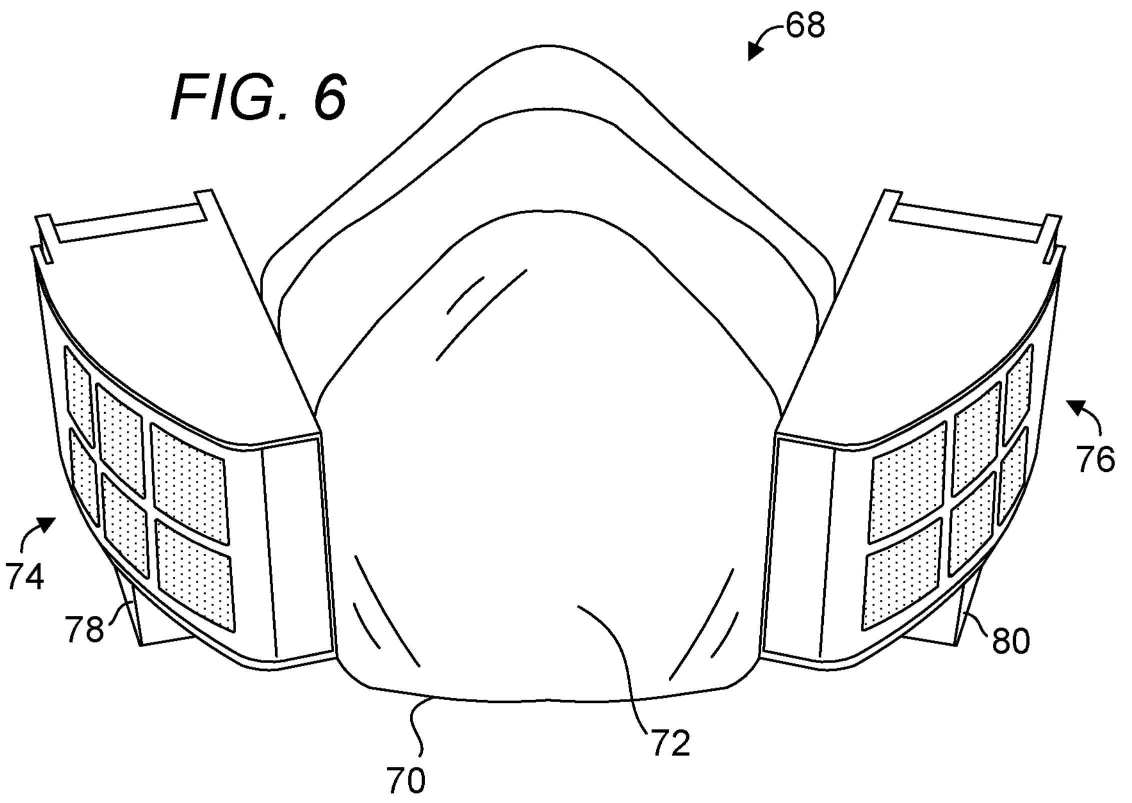
FIG. 6 illustrates a perspective view of an exemplary active respiratory filtration system, having right and left chamber assemblies comprising respective right and left forced air modules.

FIG. 6 illustrates a perspective view of an exemplary active respiratory filtration system 68. Active respiratory filtration system 68 is adapted to affix to user 2, as shown in subsequent FIG. 7. The inner volume formed by oronasal cover 70, located behind front face 72, delineates breathing chamber 60 (best depicted in FIG. 8). Breathing chamber 60 is fluidly connected to right and left chamber assemblies 74 and 76. Each chamber assembly provides a holding enclosure or predetermined location for a filter, such as exemplary filter 26. Additionally, right chamber assembly 74 possesses a removable right forced air module 78; and left chamber assembly 76 possesses a removable left forced air module 80. Except for the right forced air module 78 and left forced air module 80, exemplary active respiratory filtration system 68 is substantially similar to the aforementioned embodiments, such as delineated in FIG. 3. Because of the additional apparatus, it is reasonable to expect that some embodiments associated with active respiratory filtration system 68 possess greater volume, weight, and cost, when compared to the passive respiratory filtration system counterpart.

Figure 7:
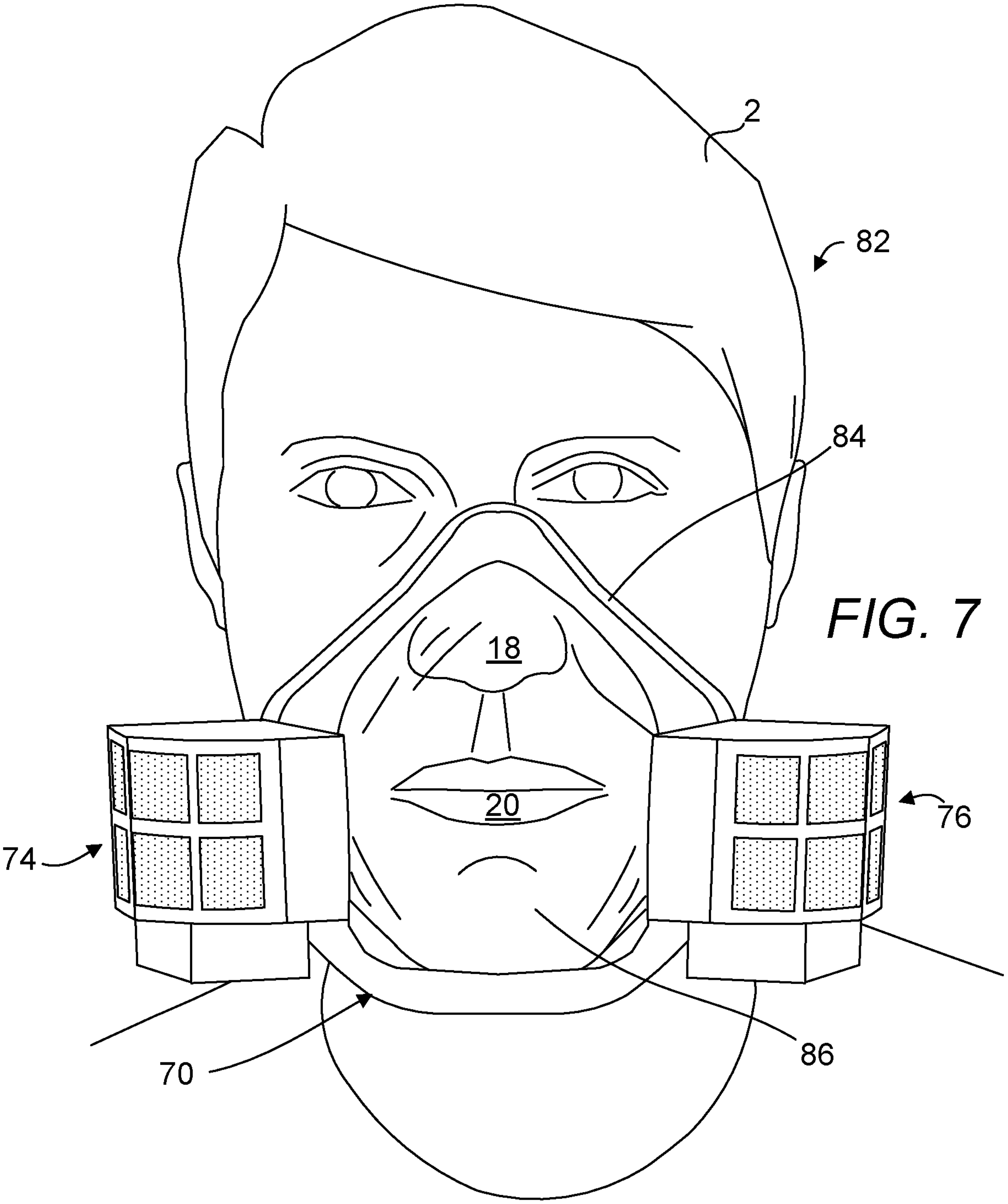
FIG. 7 illustrates a front view of a respiratory filtration system, alternate embodiment, affixed to a user.

FIG. 7 illustrates a front view of an exemplary active respiratory filtration system 82 affixed to a user 2. The embodiment explicitly depicts oronasal cover 70 having a transparent expression window 86 where user's 2 oronasal area, including nose 18 and mouth 20, are clearly visible to an observer(s). Additionally depicted is oronasal cover 70 further including conformable engagement seal 84 about its circumferential edge, which is configured to sealingly engage with nose-mouth perimeter 16. In environments having high airborne contaminates, enhanced sealing engagement between user 2 and oronasal cover 70 is recommended, and again, can be attained by the use of a conformable engagement seal 84, or the like.

Figure 8:
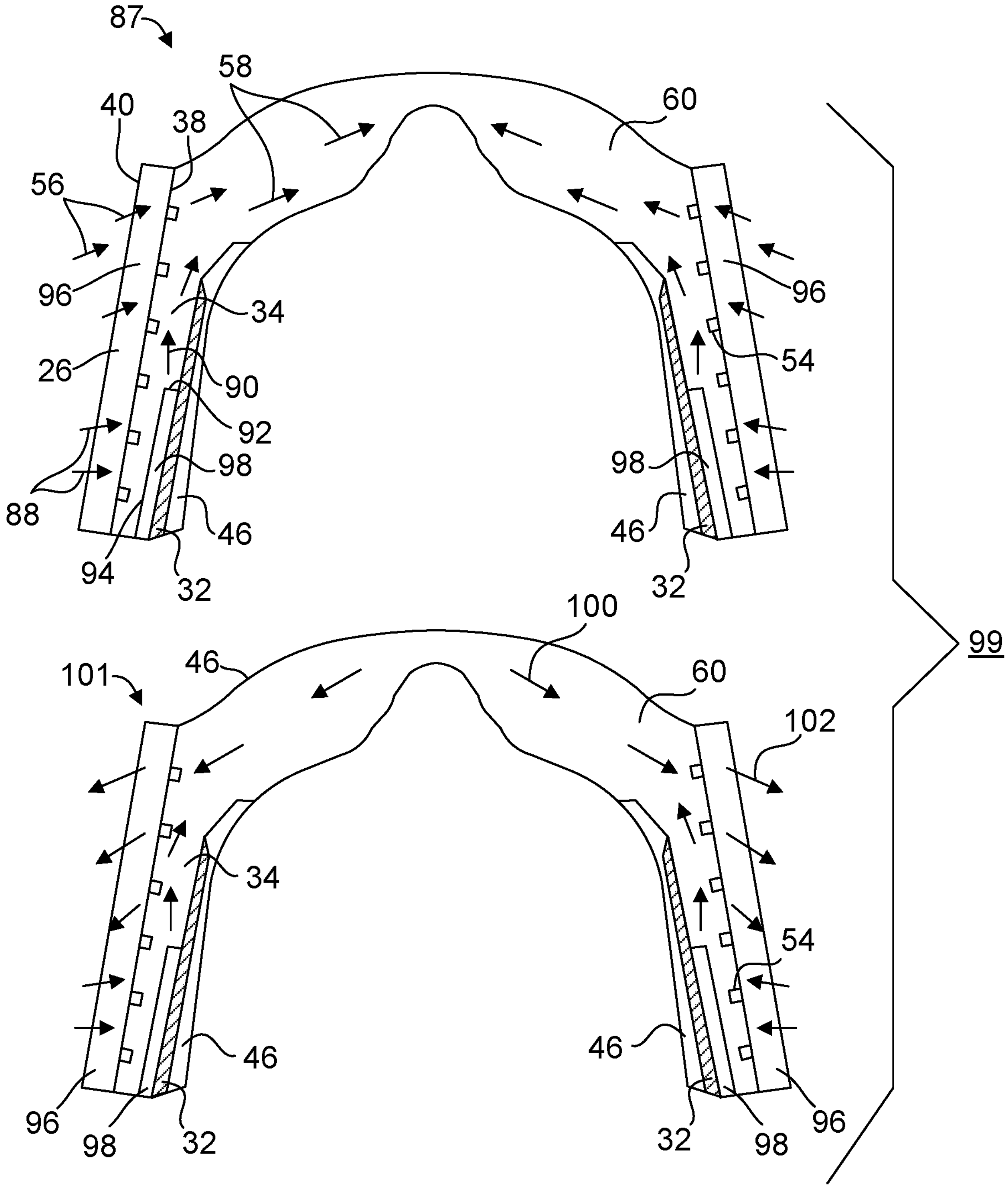
FIG. 8 illustrates top view, airflow diagrams of an exemplary active respiratory filtration system. Diagrams include airflow depictions during both phases of the user's breathing cycle, i.e., inhalation, exhalation.

FIG. 8 illustrates top view airflow movements for inhalation phase 87 and exhalation phase 101. Complete breathing cycle 99 is comprised of inhalation phase 87 and exhalation phase 101. The depictions are directed to exemplary active respiratory filtration type systems containing both a right forced air module 78 and a left forced air module 80 in their corresponding chamber assemblies. The function of the right forced air module 78 and a left forced air module is to assist user 2 with the inhalation phase 87 comprising approximately half of complete breathing cycle 99; or in other words, supply supplemental filtered air 90 to user 2. By supplying supplemental filtered air 90 to user 2, the inhalation effort associated with user 2 is reduced.

Illustrated in inhalation phase 87 are right and left filters 96 engaging stops 54. Inner faces 38 of filter 96 forms one surface of elongated air filter dispersion cavity EAFDC 34 enclosures, whereas inner wall 32 forms the opposing surfaces. Air pumps 98 (fans) are attached to inner walls 32, and provide supplemental filtered air 90 by pulling additional air through air filters 96 via module input 94, and delivering the supplemental filtered air 90 to breathing chamber 60 via module output 92. Supplemental filtered air 90 is additional air superimposed over unfiltered air 56 motivated by user 2. Unfiltered air 56 is drawn in from the ambient environment, and pulled through air filter 26, resulting in filtered air 58. Both supplemental filtered air 90 and filtered air 58 enter EAFDC 34 in a substantially uniform manner about the EAFDC 34's length, which prevents preferring or burdening one portion of air filter 26 over another portion, ensuring filtration load leveling, thereby improving filter performance and filter life.

Breathing chamber 60 formed by oronasal cover 46, encloses both nose 18 and mouth 20. The distance from mouth 20 and the inner surface of oronasal cover 46 is represented as mouth to oronasal cover gap 52 (best depicted in FIG. 4). Via experimentation, it has been determined that oronasal cover gap 52 distance is critical in the reduction/elimination of speech distortion. A working range for oronasal cover gap 52 is from about 0.5 inches to about 2.0 inches; whereas a more preferred range is from about 1.0 inches to about 2.5 inches; yet another preferred range is from about 1.5 inches to about 3.0 inches.

The aforementioned apparatus described in inhalation phase 87 remains unchanged during exhalation phase 101. With respect to the exhalation phase 101 air movement, user 2 expels exhalation air 100 into breathing chamber 60 where it travels into elongated air filter dispersion cavity EAFDC 34, where it uniformly engages inner face 38 (of filter 26), and exhausting filtered air 102 into the ambient environment.

Figure 9:
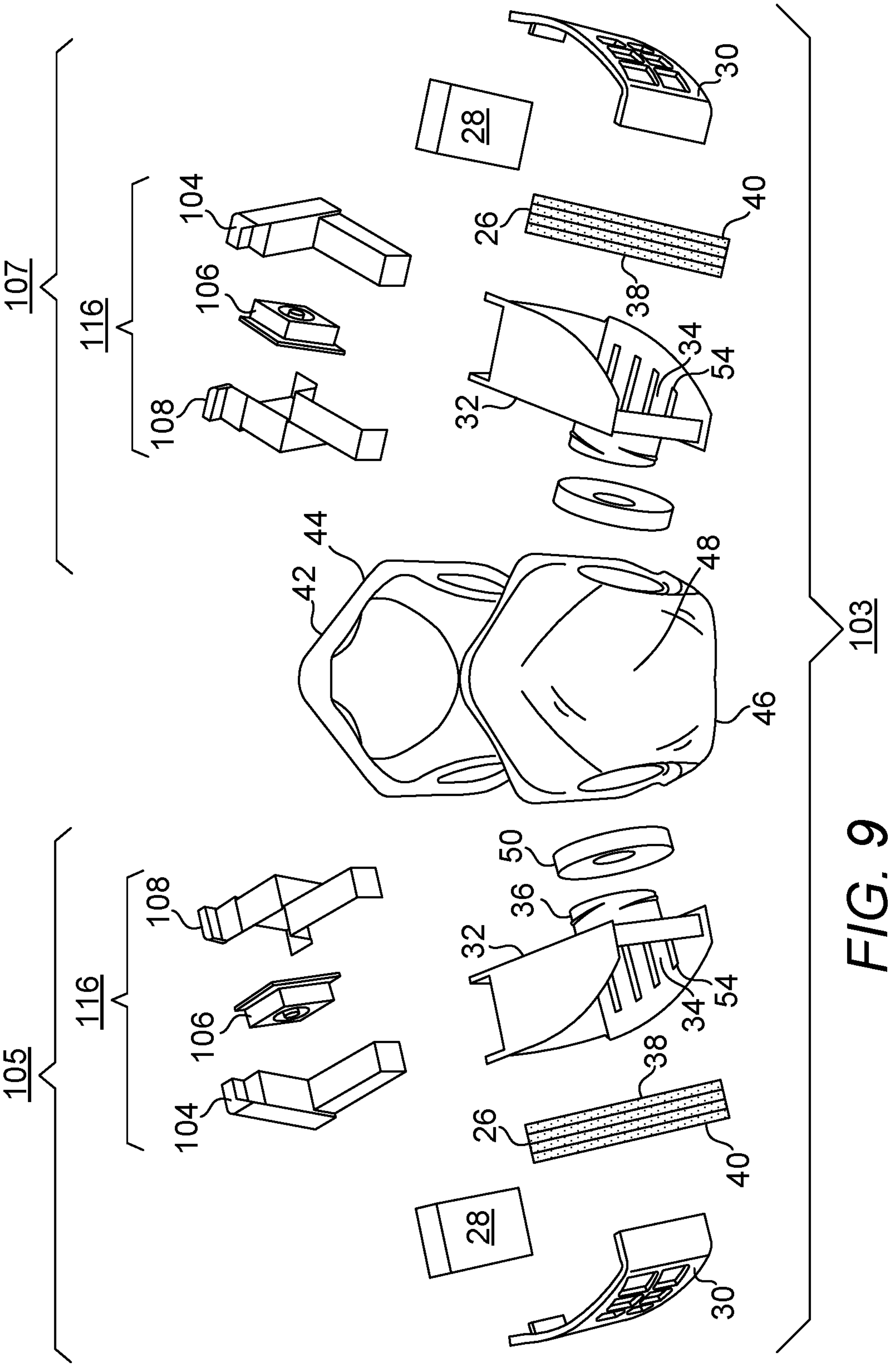
FIG. 9 depicts an exploded perspective view of exemplary components comprising an active, modular respiratory filtration system.

FIG. 9 depicts an exploded perspective view of exemplary components comprising active respiratory filtration system 103. Active respiratory filtration system 103 is comprised of three fluidly interconnected subsystems, right chamber assembly 105, left chamber assembly 107, and centrally located oronasal cover 46, fluidly connecting all the assemblies. It is understood that typical embodiments of the present invention are substantially symmetrical about oronasal cover; therefore, components depicted on right chamber assembly 105 are substantially mirror images of those components associated with left chamber assembly 107. Accordingly, right chamber assembly 105 is comprised of the following main components:

Air filter 26, which can be fabricated from a variety of filtration type materials, such as a pathogenic filtering material, a particulate contaminant filtering material, a HEPA certified material or any combination thereof. Air filter 26 is comprised of two primary, opposing surfaces, inner face 38 and outer face 40.

End-cover 28, which, some embodiments, functions as a service door, in other embodiments, it serves to convert an active respiratory filtration system to a passive respiratory filtration system by sealing the openings of chamber assemblies 105 and 107, sans a forced air module 116 (best depicted in FIG. 10). Some active respiratory filtration system 103 embodiments possess a forced air module which can incorporate the door function, so end-cover 28 is not required in such embodiments.

Vented outer wall 30, functions as a support member for chamber assemblies 105 and 107; as well as providing the venting means for air movement to and from the system. Inner wall 32 provides a support surface for air portal 36, as well as providing structure for the elongated air filter dispersion cavity EAFDC 34 enclosure. Note that fastener 50 engages distal end portion air portal 36, and functions to fasten oronasal cover 46 to right chamber assembly 105 and left chamber assembly 107.

Elongated air filter dispersion cavity, EAFDC 34 is a gap or void primarily bound by inner wall 32 and inner face 38 of air filter 26, and serves to load level or balance the air interactions with filter 26, so that one portion of filter 26 does not bear a greater burden than any other portion, thereby extending filter life and filter performance. Filter 26 is held in place by a series of stops 54, such stops 54 can take on a variety of forms, including ribs, posts, and the like.

Forced air module 116 is a removable/replaceable module used in both right chamber assembly 105 and left chamber assembly 107. Forced air module 116 is comprised of an air pump or fan 106, which is supported by outer module fan housing 104 and inner module fan housing 108. Details associated directed to forced air module 116 can be found on FIG. 10 and corresponding explanations. Forced air module 116 is inserted against inner wall 32 in both right chamber assembly 105 and left chamber assembly 107 as shown in FIG. 11, and maintains the gap or void required to ensure the formation of elongated air filter dispersion cavity EAFDC 34.

Oronasal cover 46 provides a substantially sealed breathing chamber 60 for user 2. Depending on needs of the situation, there are a variety of configurations the oronasal cover 46 can possess. For example, transparent materials can be utilized on at least front face 48 when a clear view of the oronasal portion of user 2 is of importance, or a nontransparent filtration material optimized for speech transmission can be used when verbal communications govern the situation at hand. Oronasal cover 46 includes an oronasal circumferential edge 44 that substantially sealingly engages nose-mouth perimeter 16. Enhanced sealing engagement can be attained by the use of a conforming seal 42 disposed about oronasal circumferential edge 44.

Figure 11:
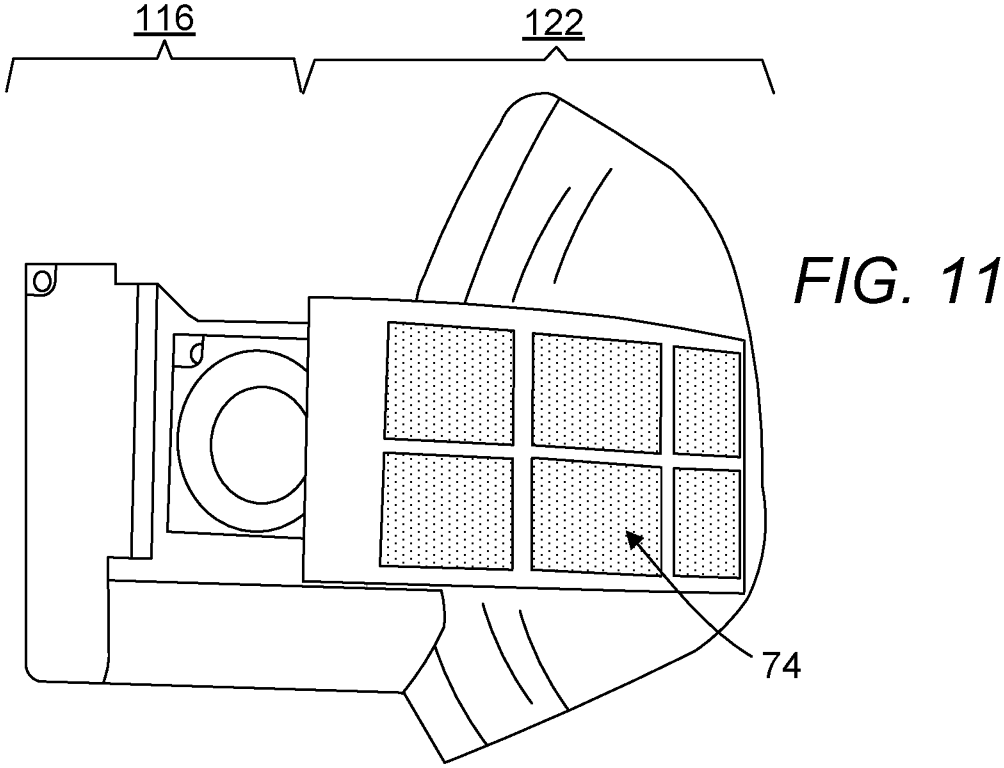
FIG. 11 illustrates a side view of a forced air module partially installed into the receiving portion of the chamber assembly located on both the right and left sides of an active respiratory filtration system.

FIGS. 10 and 11 illustrate a perspective view of forced air module 116. An active, modular respiratory filtration system will have a forced air module 116 configured for the left side of the system and a forced air module configured for the right portion of the filtration system. In FIG. 11, forced air module 116 is shown partially inserted/installed in receiving portion 122 of right chamber assembly 74. A forced air module 116 can be fabricated using a variety of components, depending on the desired functions. An exemplary forced air module 116 is comprised of the following basic components or systems/subsystems:

Fan 106, is supported by outer module fan housing 104 and inner module fan housing 108 as depicted in more detail in FIG. 9. Fan 106 includes module input 94 and module output 92 depicted in FIG. 8 and functions as described in corresponding explanations.

Power source 120 (battery) functions to power fans 106, power control board(s) 112, and the like. Power source 120 (battery) can be rechargeable or of the single use variety.

Control system 110 can be fabricated using a variety of components, depending on the desired functions. Depicted is control system 110 comprising on-off switch 114 and control board 112. Other embodiments can include battery charging ports, LED/Lights to provide the user with a variety of indicators for: remaining battery life, charging status, power on/off status, and the like.

Control board(s) 112, this electrical system can be fabricated using a variety of components, depending on the desired functions. Control board(s) 112 embodiments can further include a means for controlling the speed or volume of air movement delivery from power fans 106.

Figure 12:
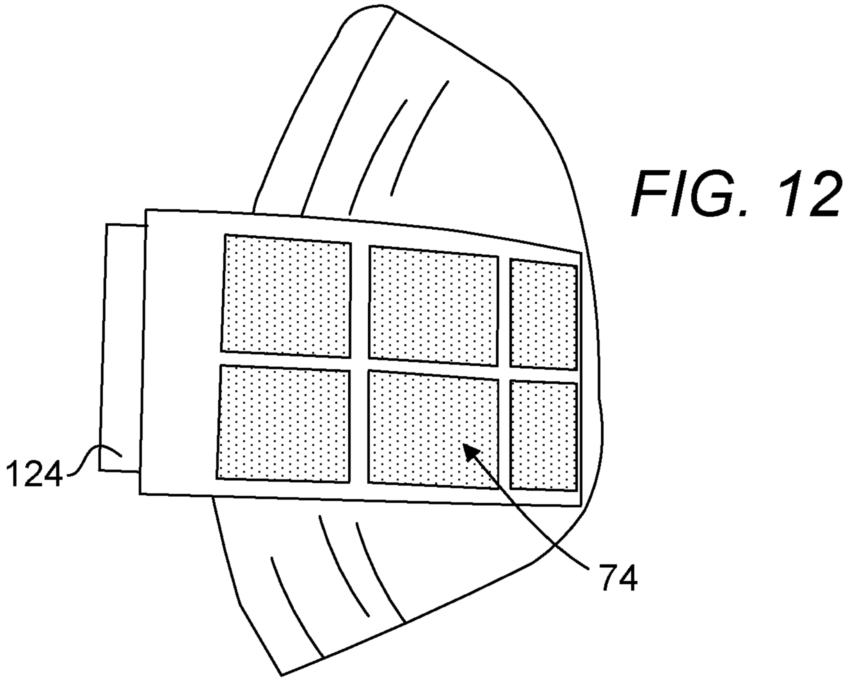
FIG. 12 illustrates a conversion end-cover or plug inserted into the chamber assembly of an active respiratory filtration system. The conversion end-cover member converts an active modular respiratory filtration system to a passive system, by the elimination of the forced air module.

FIG. 12 illustrates a conversion end-cover 124 or plug inserted into the chamber assembly of an exemplary active modular respiratory filtration system, end-cover 124 is configured to sealingly engage the receiving portion of the chamber assembly in order to enable proper filtering. End-cover 124 converts an active modular respiratory filtration system to a passive system, by the elimination of the forced air module.

Figure 13:
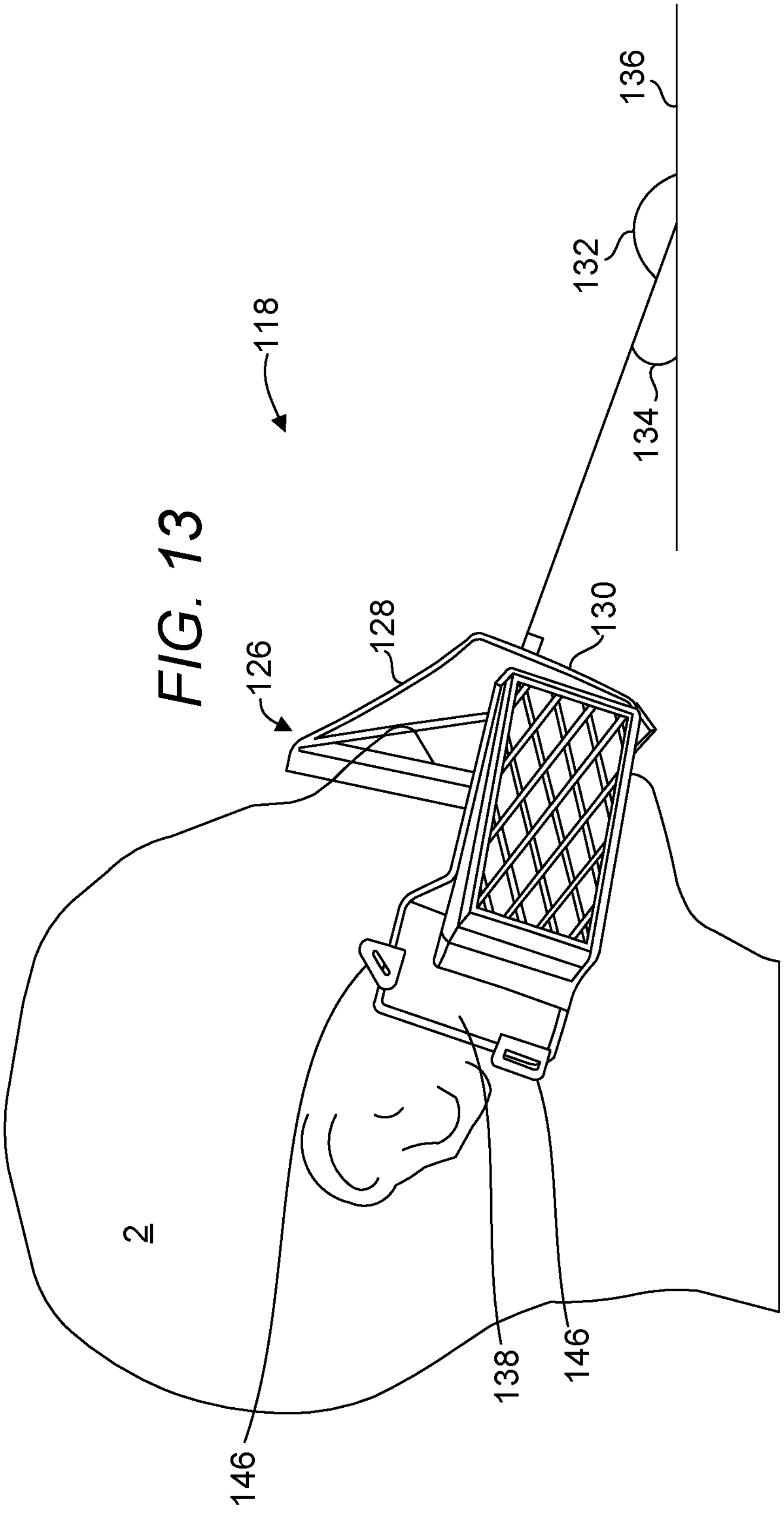
FIG. 13 illustrates a side view of another embodiment of respiratory filtration system having an oronasal cover with front face comprising more than one planar surface.

FIG. 13 illustrates a side view of anti-glare respiratory filtration system 118, which can be either active or passive. Anti-glare respiratory filtration system 118 embodiment includes a multi-planar transparent oronasal cover 126, comprising lower expression window 130 and upper window 128. Lower expression window 130 is configured to allow an observer to at least view mouth 20 of the oronasal area circumscribed by nose-mouth perimeter 16 shown in FIG. 2. It is understood that there are preferential embodiments where the surface area of lower expression window 130 is maximized to further increase the viewing area of the user's 2 oronasal area for enhanced visual type communications.

Light glare or light reflection issues associated with transparent oronasal cover 126 type covers can interfere with the observer(s) ability to decipher user's 2 oronasal area expressions and can degrade visual communications. Light glare issues can be minimized/eliminated by configuring planar lower expression window 130 to possess an angle of inclination 132, from about 150 degrees to about 170 degrees taken in a counter clock wise direction from horizon line 136; equivalently, the supplementary angle 134 ranges from about 10 degrees to about 30 degrees taken in a clockwise direction from horizon line 136.

Figure 14:
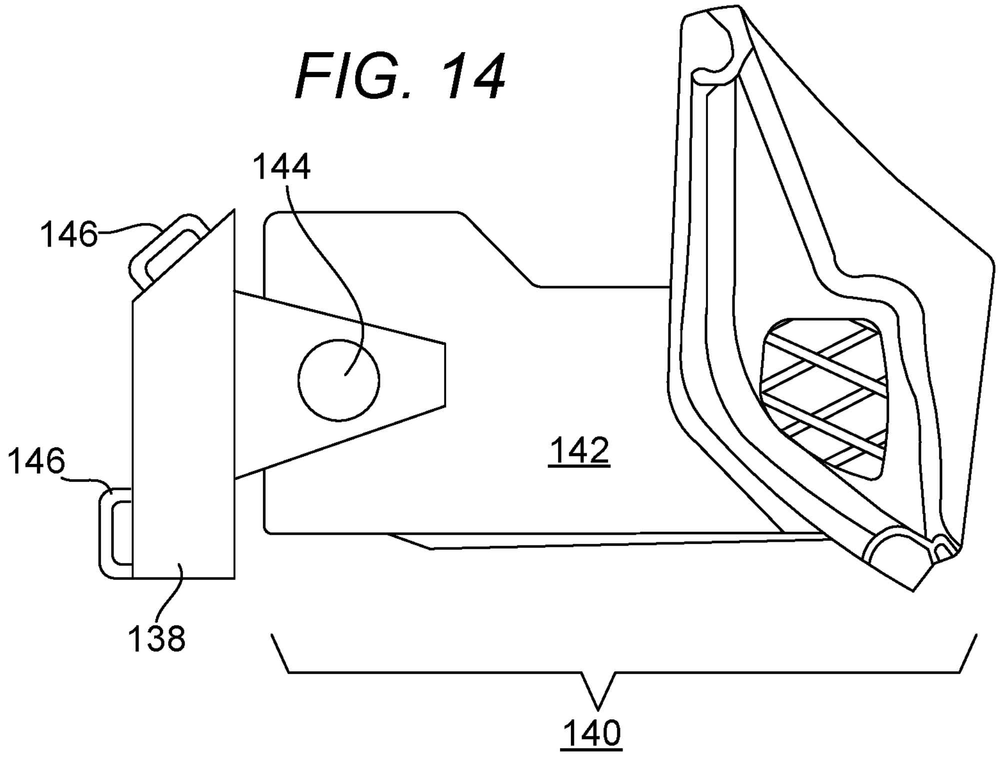
FIG. 14 illustrates a cut-away side view of the respiratory filtration system embodiment shown in FIG. 13. Depicted is a strap plate attached to a harness base plate via a pivot point.

FIG. 14 illustrates a cut-away side view of the respiratory filtration system embodiment shown in FIG. 13. Depicted is rotatable strap plate 138 pivotally attached to support member 142 via pivot point 144. Rotatable strap plate 138 includes support strap receptacles 146 for receiving support strap(s) 6, for engaging user's 2, ears 7, or like support feature(s). Main portion 140 of the harnessing system is substantially supported by the oronasal features of user 2, whereas rotatable strap plate 138 is supported by user's side/rear head features, such as the ears 7, the back of head, or the like. Any vertical motion imparted to main portion 140, such as when user 2 is speaking, is mechanically decoupled from rotatable strap plate 138, via pivot point 144. By decoupling rotatable strap plate 138 from main portion 140, annoying tugs and pulls transmitted to the support strap(s) 6 attached to user's 2 head, when speaking is substantially reduced/eliminated.

Figure 15:
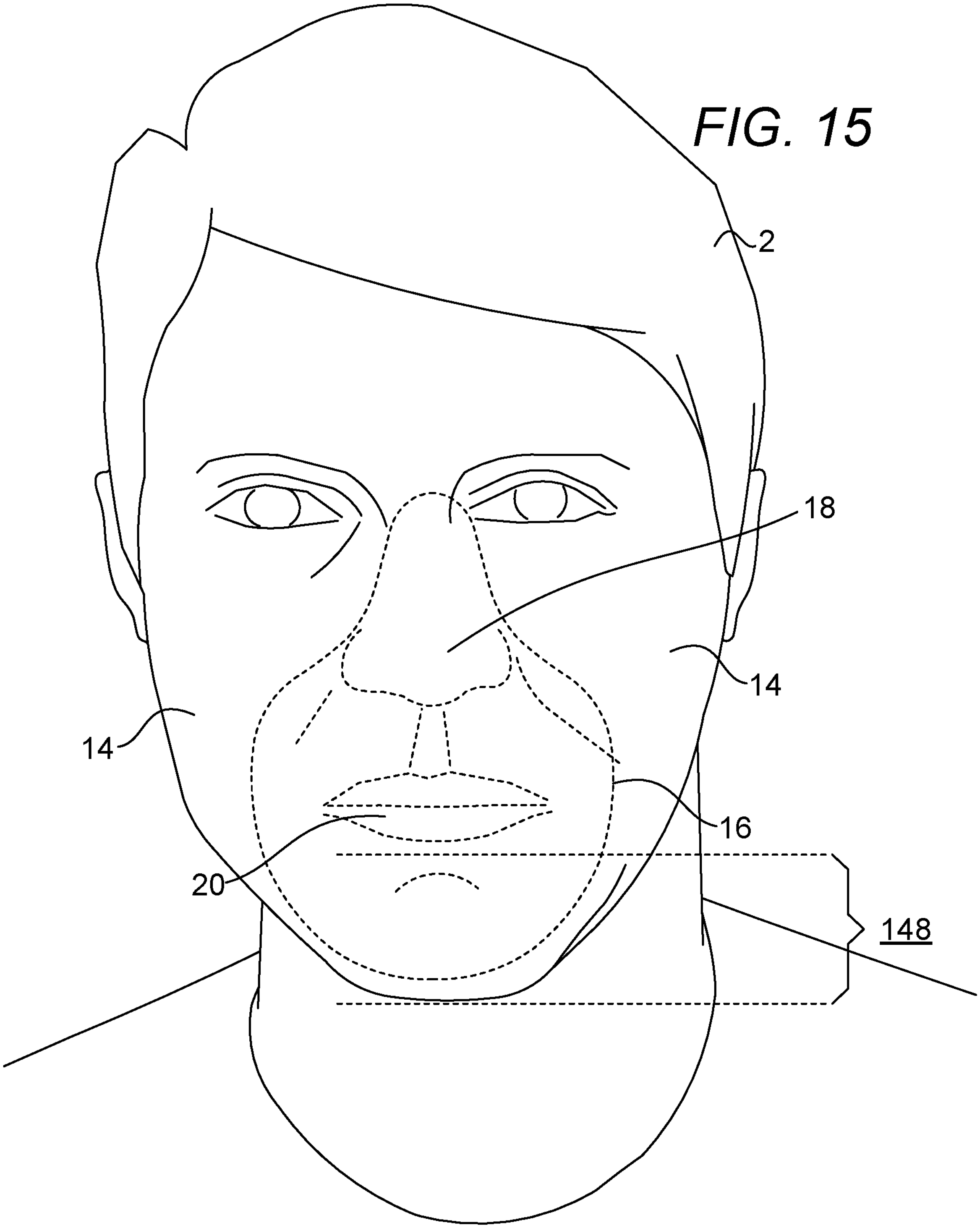
FIG. 15 illustrates a front view of a user, showing pertinent facial features. Delineated is the user's chin area and nose-mouth perimeter produced by the individual geometries of the user's nose and mouth and positional relationships thereof.

FIG. 15 illustrates a front view of user's 2 head, showing pertinent facial features. Delineated is a nose-mouth perimeter 16 formed by the combination of the individual geometries of nose 18 and mouth 20 and positional relationships thereof. The areas delineated as cheek areas 14 and chin area 148 are examples of impassive facial features, and are areas for locating nontransparent components, such as filters. Such an arrangement frees up the oronasal area for the use of transparent expression window(s), typically fabricated from transparent, nonporous, polymeric type materials. Transparent expression window(s) permit one or more observers, substantial viewing of the oronasal areas of user 2, thereby improving visual communications.

Figure 16:
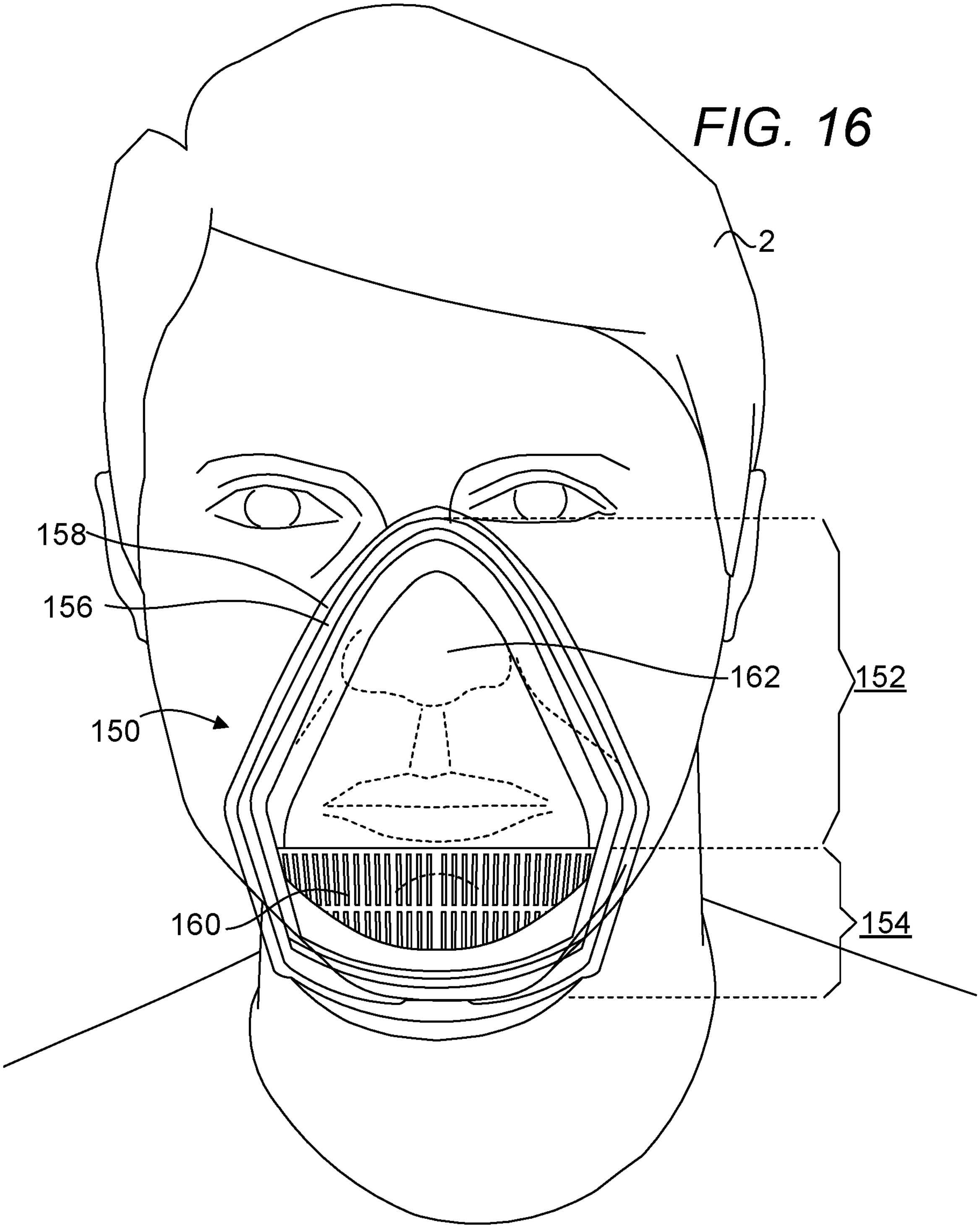
FIG. 16 illustrates a front view of a substantially vertical embodiment of a passive respiratory filtration system affixed to a user. The vertical embodiment is comprised of a housing having an upper portion for accommodating an expression window and a lower portion for the accommodation of an air filter.

FIG. 16 illustrates a front view of a substantially vertical, exemplary passive respiratory filtration system 150 affixed to a user 2. The embodiment is comprised of housing 156 having an upper portion 152 for accommodating at least one expression window 162 and a lower portion 154 for the accommodation of an air filter, located behind lower air vents 160. The geometry of housing 156 is substantially dome-like where the inner portion of the dome serves as a breathing chamber 163, best depicted in FIG. 17. The term dome or dome-like shall be interpreted in the general sense, where the term includes a variety of three dimensional cup-like geometries. Some of these geometries are not symmetrical; additionally some of the embodiments include geometries having both curvilinear and planar portions.

Passive respiratory filtration system 150 is comprised of a substantially rigid housing 156 which provides the system structural support. The housing material can be fabricated from virtually any polymeric engineering material, e.g., polycarbonate. Housing 156 can be configured from transparent materials or non-transparent materials, whereas expression window 162 must be substantially transparent. Seal 158 is fabricated from sealingly pliable materials, e.g., silicone, for providing adequate airtight engagement between filtration system 150 and nose-mouth perimeter 16.

Figure 17:
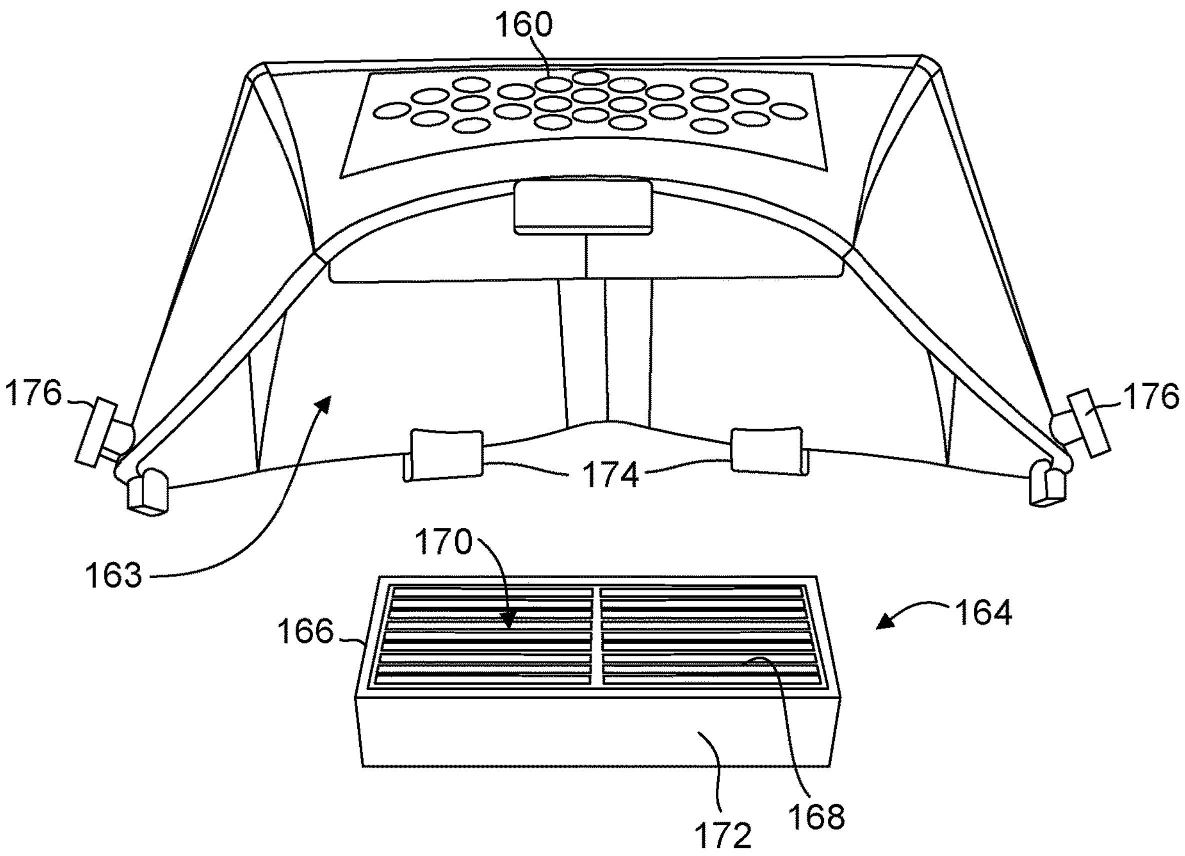
FIG. 17 depicts an exploded perspective view of a passive, modular respiratory filtration system. Components shown include an internal filter cartridge and a breathing chamber having cartridge attachment clips for sealingly securing the cartridge against the lower air vents of the housing.

FIG. 17 depicts an exploded perspective view of the typical components comprising a passive respiratory filtration system 150. Primary components shown include an internal filter cartridge 164 and a housing 156 configured to provide a breathing chamber 163. The breathing chamber 163 portion of housing 156 possesses lower air vents 160 and associated cartridge retaining clips 174 for sealingly securing internal filter cartridge 164 to housing 156. In some embodiments, internal filter cartridge 164 is configured to be replaceable within the respiratory filtration system 150.

Internal filter cartridge 164 is comprised of a substantially rigid, cartridge housing 172 configured to retain filtration media 168. Cartridge 164 possesses filtration area 170 encircled by cartridge seal 166 configured to sealingly envelop lower air vents 160 so to produce a substantially sealed breathing chamber 163. Housing 156 further includes upper support posts 176, and lower support posts (best depicted in FIG. 20) for securing support strap(s) 198, or the like.

Figure 18:
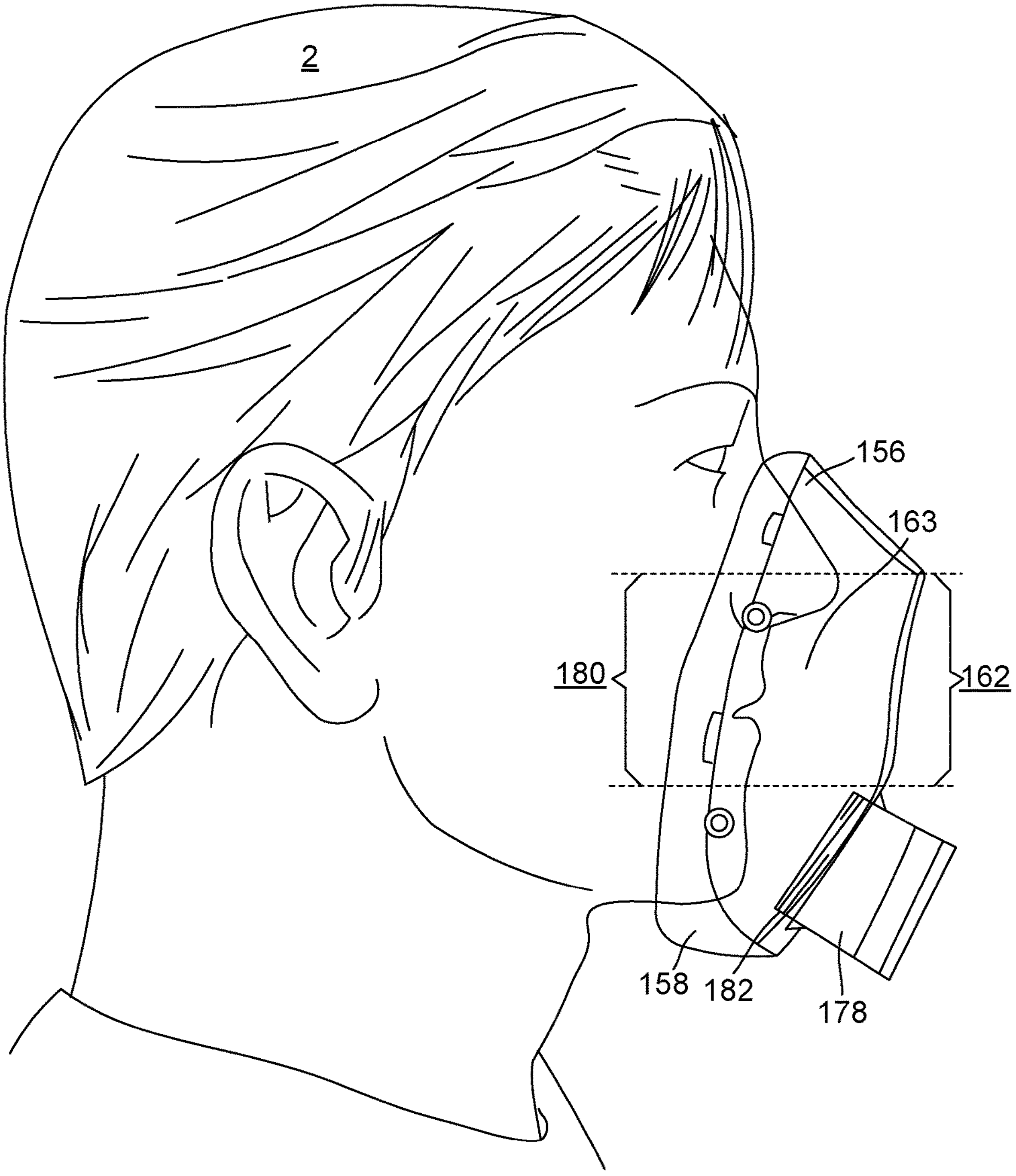
FIG. 18 illustrates a side view of a passive respiratory filtration system. Depicted is an alternate vertical embodiment affixed to a user, wherein the embodiment comprises an external filtration cartridge affixed over the user's chin area.

FIG. 18 illustrates a side view of another passive respiratory filtration system affixed to user 2. The embodiment of FIG. 2 includes an external filtration cartridge 178 affixed over, or covering, the user's impassive chin area 148. This particular external filtration cartridge 178 embodiment is cylindrical, enabling the uses of engagement threads 182 to secure the cartridge on to housing 156. Engagement threads 182 are comprised of male and female thread features; one portion residing on cartridge 17, and the mating threads residing on lower portion 154 of housing 156, to enable removable engagement.

External filtration cartridge 178 is configured to engage housing 156 so to not block oronasal features 180 from an observer(s). Cartridge 178 is disposed over user's chin area 148, which is considered an impassive facial location, providing limited visual cues or communication from the user, unlike the oronasal features 180. Oronasal features 180 of user 2 provide a vast amount of visual communications from user 2; such communications includes the emotional state of the user as well as informational communications, e.g., a hearing impaired observer having to read lips, and the like. The present invention enables an observer(s) to view user's 2 oronasal features 180 via an optically transparent expression window 162.

Figure 19:
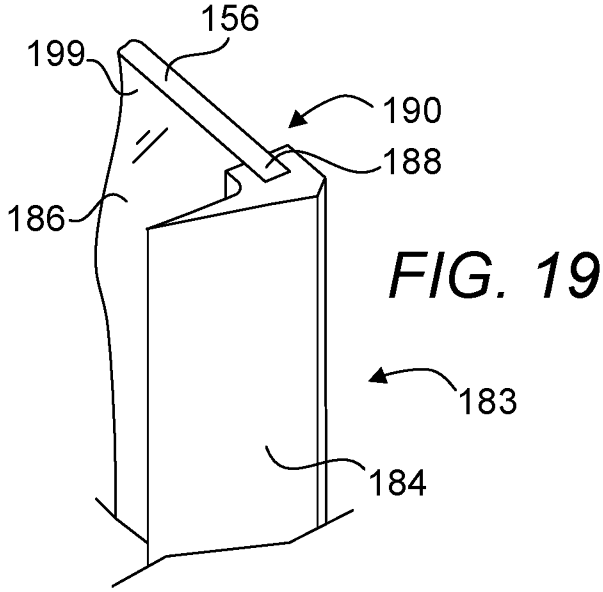
FIG. 19 illustrates a perspective view of an inboard flexible sealing member affixed to the housing wall.

FIG. 19 illustrates a perspective view of an advanced seal 183 comprising an inboard flexible sealing member 184 affixed to housing wall 186. Advanced seal 183 attached to housing edge 188 portion of housing 156 is depicted as seal-housing engagement 190. In some embodiments, advanced seal 183 is configured to be replaceable. Advanced seal 183 is secured to housing 156 by engaging the housing edge 188, chamber outer surface 197, chamber inner surface 199 or any combination thereof. Advanced seal 183 is preferably fabricated from sealingly pliable materials, e.g., silicone, for providing adequate airtight engagement between breathing chamber 163 and the outside environment; or alternately described, between filtration system 150 and nose-mouth perimeter 16. Inboard flexible sealing member 184 is biased in an inward direction toward the center of the given mask device, and in preferred embodiments the seal wall thickness gradually tapers off. One of the primary advantages associated with using an Inboard flexible sealing member 184 is that during exhalation by a user, the pressure created causes inboard flexible seal 200 to flex toward the user's face, thereby, via air pressure feedback, providing an enhanced seal.

Figure 20:
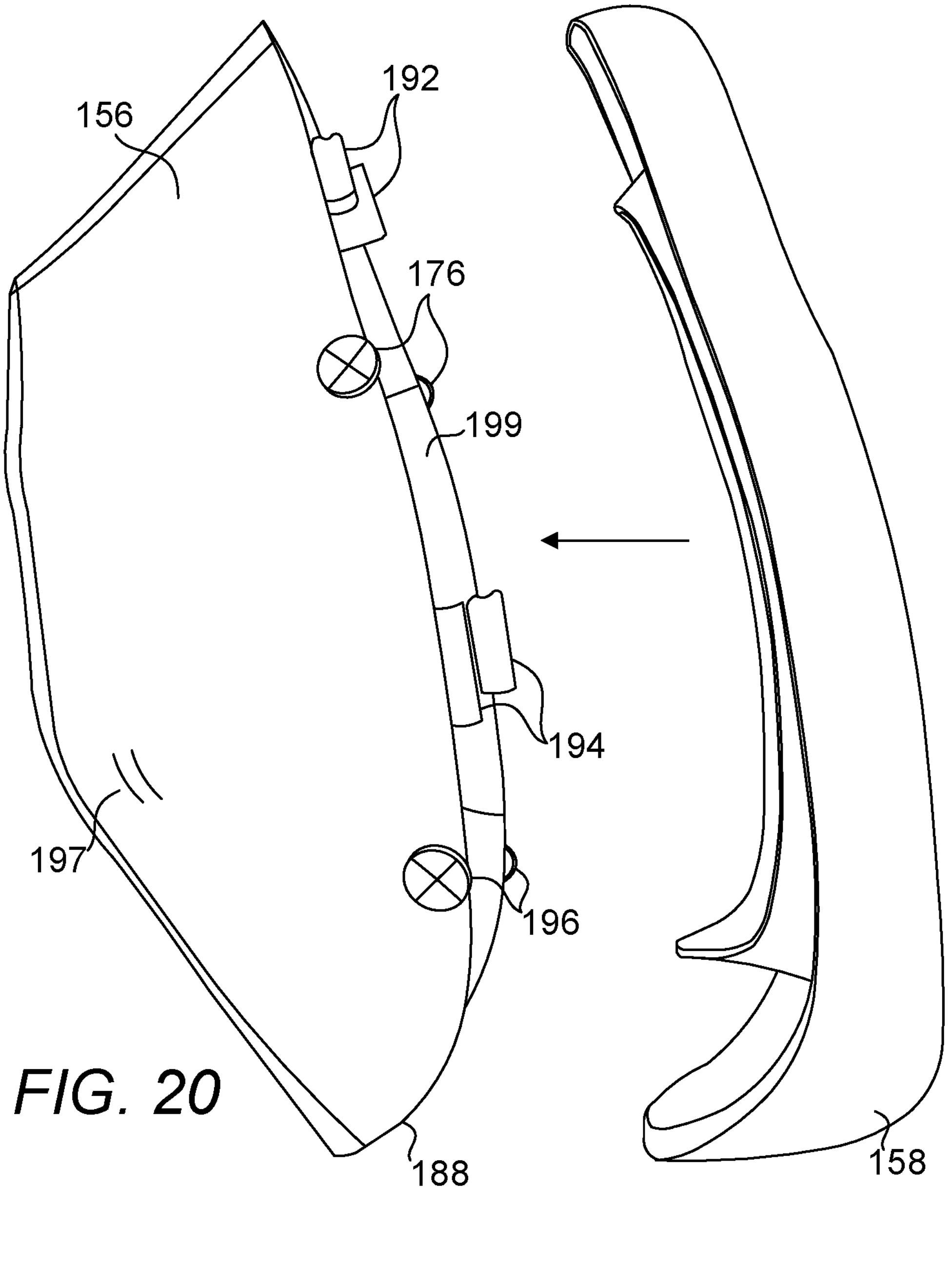
FIG. 20 depicts an exploded side view of a housing comprising upper and lower seal attachment clips and a corresponding seal member positioned for attachment.

FIG. 20 depicts an exploded side view of housing 156 comprising upper seal attachment clips 192, and lower seal attachment 194 and corresponding seal 158 positioned for attachment to housing 156. Seal 158 is secured to housing 156 via upper seal attachment clips 192 and lower seal attachment 194. The attachment scheme enables seal 158 to be removed or replaced. Also depicted are upper support posts 176 and lower support posts 196, both set of posts are configured to secure an appropriate number of support strap(s) 198 to affix the system to user 2. Exemplary depictions of support strap(s) 198 engagement strategies are shown in FIGS. 21 and 22.

Figure 21:
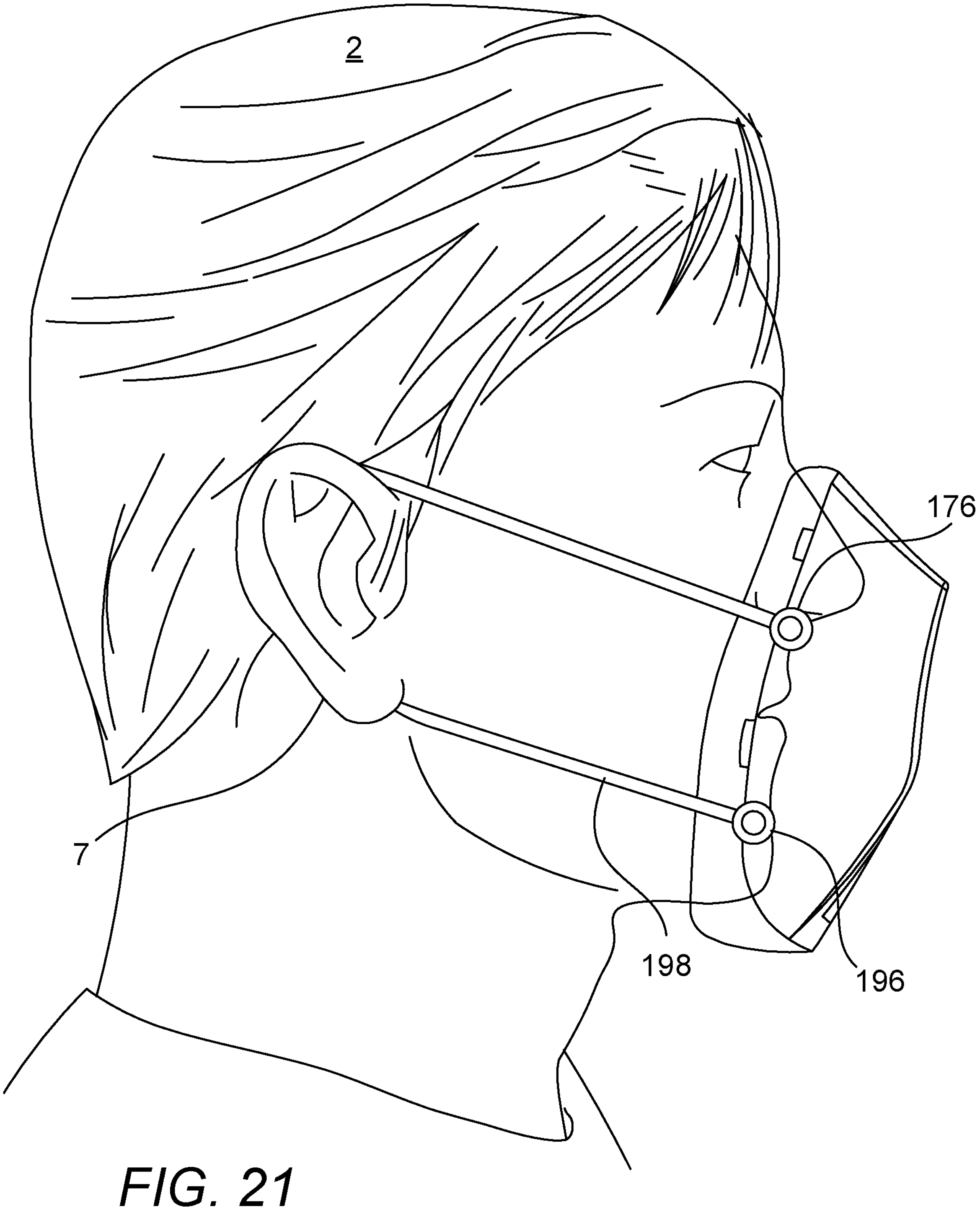
FIG. 21 illustrates a side view of an exemplary passive respiratory filtration system affixed to a user. Depicted is an exemplary support strap engaging the user's ear while support strap ends are secured to upper and lower support posts located on the housing.

FIG. 21 illustrates a side view of an exemplary passive respiratory filtration system affixed to user 2. Depicted is an exemplary setup, comprising the mediate portion of support strap 198 engaging user's 2 ear 7 while both distal ends of support strap 198 are each secured to upper support post 176 and lower support post 196. It shall be understood that a substantially similar strap configurations are duplicated on the user's opposing side in order to provide system engagement symmetry.

Figure 22:
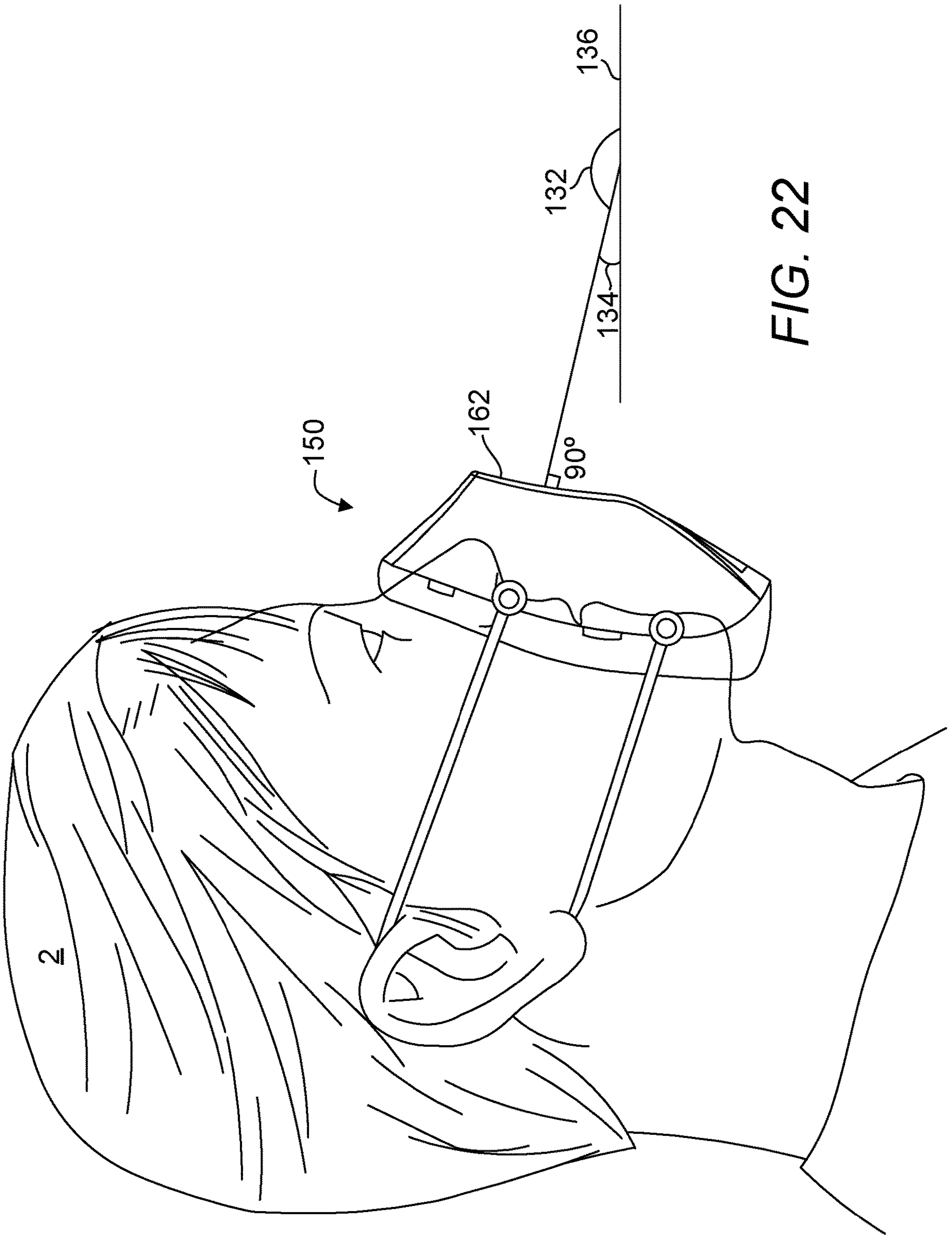
FIG. 22 illustrates a side view of a respiratory filtration system, depicting the angle of inclination of the expression window with respect to the horizon, for controlling glare.

FIG. 22 illustrates a side view of exemplary glare controlling respiratory filtration system 150, depicting upper expression window 162 having a predetermined angle of inclination 132 of with respect to horizon 136. The anti-glare respiratory filtration system 150 includes an upper portion 152 comprising a substantially planar expression window 162 which is configured to allow an observer to view at least view mouth 20 of the oronasal area circumscribed by nose-mouth perimeter 16 shown in FIG. 15. In preferred embodiments, both nose 18 and mouth 20 areas are clearly visible through expression window 162 by one or more observers. It shall be understood that there are preferential embodiments where the surface area of lower expression window 162 is maximized to further increase the viewing area of the user's 2 oronasal area, extending into areas adjacent to nose 18 and mouth 20 areas, and further extending beyond nose-mouth perimeter 16 for further improving visual type communications.

Light glare or light reflection issues associated with transparent lower expression window 162, and the like, can interfere with the observer(s) ability to decipher user's 2 oronasal features 180 expressions and can degrade visual communications. Light glare issues can be minimized/eliminated by configuring any expression window. In this example, lower expression window 162 possesses a predetermined angle of inclination 132 when worn by user 2. The functional range for the angle of inclination 132 is from about 150 degrees to about 170 degrees taken in a counter-clockwise direction from horizon line 136. Equivalently, the supplementary angle 134 ranges from about 10 degrees to about 30 degrees taken in a clockwise direction from horizon line 136.

What is claimed herein is:

1. A passive respiratory filtration system adapted to engage with a user's head for providing a hygienic barrier between the user and the user's proximate surroundings, said passive respiratory filtration system comprising a housing comprising:

(a) a dome-like geometry delineating the disposition of a breathing chamber, wherein said breathing chamber comprises a chamber inner surface and a chamber outer surface, an engagement seal for providing an oronasal seal about the perimeter of at least the user's nose and mouth;

(b) an upper portion comprising an expression window substantially fabricated from a continuous planar transparent material such that an observer has a clear unambiguous optical view of at least the user's nose and mouth, said expression window comprises an angle of inclination from about 150 degrees to about 170 degrees, whereby observer glare is substantially diminished; and (c) a lower portion comprising an air filter mounting location disposed below said expression window and configured to cover the user's chin area so to not visually obstruct the nose and mouth areas of the user, said air filter mounting location is configured to sealing receive an air filter.

2. The passive respiratory filtration system of claim 1, wherein a portion of said chamber inner surface configured to cover the user's mouth, is disposed at least about 1 inch away from the user's mouth, whereby speech reflective distortions are minimized allowing an observer to receive unambiguous acoustic speech communications from the user.

3. The passive respiratory filtration system of claim 1, wherein said engagement seal is configured as an inboard flexible sealing member so to strengthen the sealing engagement between said housing and the user.

4. The passive respiratory filtration system of claim 1, further comprising an air filter sealingly attached to said air filter mounting location.

5. The passive respiratory filtration system of claim 4, wherein said air filter is replaceable.

6. The passive respiratory filtration system of claim 5, wherein said air filter is fabricated substantially from a hygienic, porous, non-transparent material selected from the group consisting of a pathogenic filtering material, a particulate contaminant filtering material, a High Efficiency Particulate Air (HEPA) certified material and any combination thereof.

7. The passive respiratory filtration system of claim 6, wherein said air filter is configured in the form of a replaceable air filter cartridge.

8. The passive respiratory filtration system of claim 7, wherein said air filter is configured in the form of a replaceable air filter cartridge, said replaceable air filter cartridge is configured to sealingly attach to said chamber outer surface, such that said replaceable air filter cartridge is external to said breathing chamber.

9. The passive respiratory filtration system of claim 8, wherein said replaceable air filter cartridge further comprises a set of attachment threads disposed on at least one end of said replaceable air filter cartridge and a corresponding set of mating attachment threads disposed on said air filter mounting location.

* * * * *